US010997003B2

(12) United States Patent
Yamawaki et al.

(10) Patent No.: US 10,997,003 B2
(45) Date of Patent: May 4, 2021

(54) ELECTRONIC APPARATUS, METHOD FOR ADDING FUNCTION, AND NON-TRANSITORY RECORDING MEDIUM

(71) Applicants: Taku Yamawaki, Tokyo (JP); Kayo Yokoyama, Kanagawa (JP)

(72) Inventors: Taku Yamawaki, Tokyo (JP); Kayo Yokoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/571,874

(22) Filed: Sep. 16, 2019

(65) Prior Publication Data
US 2020/0012547 A1 Jan. 9, 2020

Related U.S. Application Data

(63) Continuation of application No. 15/850,160, filed on Dec. 21, 2017, now Pat. No. 10,452,457.

(30) Foreign Application Priority Data

Dec. 26, 2016 (JP) .............................. JP2016-251729

(51) Int. Cl.
*G06F 9/54* (2006.01)
*H04N 1/00* (2006.01)

(52) U.S. Cl.
CPC ......... *G06F 9/546* (2013.01); *H04N 1/00938* (2013.01); *H04N 2201/0094* (2013.01)

(58) Field of Classification Search
None
See application file for complete search history.

(56) References Cited

U.S. PATENT DOCUMENTS

2006/0064297 A1 3/2006 Sugishita et al.
2009/0217349 A1 8/2009 Terashita
(Continued)

FOREIGN PATENT DOCUMENTS

| CN | 101515982 A | 8/2009 |
|----|-------------|--------|
| CN | 102340616 A | 2/2012 |

(Continued)

OTHER PUBLICATIONS

Chinese Office Action dated Mar. 11, 2019 for CN Application No. 201711421591.X.

(Continued)

*Primary Examiner* — Syed A Roni
(74) *Attorney, Agent, or Firm* — Harness, Dickey & Pierce, P.L.C.

(57) ABSTRACT

An electronic apparatus includes a memory and circuitry. The memory stores a plurality of programs, and program registration information including identification information of the plurality of programs each of which is permitted to be executed in the electronic apparatus. The circuitry executes a first program of the plurality of programs stored in the memory. The circuitry executes a second program according to a determination that the identification information of the program registration information includes identification information of the second program stored in an external memory connectable to the electronic apparatus. The circuitry causes the first program and the second program, which are executed, to be communicable with each other to newly add a function to the electronic apparatus.

18 Claims, 21 Drawing Sheets

(56) References Cited

U.S. PATENT DOCUMENTS

| | | |
|---|---|---|
| 2012/0017286 A1 | 1/2012 | Ogura |
| 2013/0194630 A1 | 8/2013 | Kishimoto |
| 2013/0271786 A1 | 10/2013 | Yokoyama |
| 2015/0249769 A1 | 9/2015 | Asahara |
| 2016/0006886 A1 | 1/2016 | Sato |
| 2016/0378412 A1* | 6/2016 | Hayashi |
| 2017/0308646 A1 | 10/2017 | Yamawaki |

FOREIGN PATENT DOCUMENTS

| | | |
|---|---|---|
| EP | 2230599 B1 | 11/2015 |
| JP | 2000-047959 A | 2/2000 |
| JP | 2005-100187 A | 4/2005 |
| JP | 2006-198241 A | 8/2006 |
| JP | 2010-219962 A | 9/2010 |
| JP | 2012-252457 A | 12/2012 |
| JP | 2013-103411 A | 5/2013 |
| JP | 2013-152666 A | 8/2013 |
| JP | 2014-120824 A | 6/2014 |
| JP | 2014-217996 A | 11/2014 |
| JP | 2015-026214 A | 2/2015 |
| JP | 2016-052743 A | 4/2016 |
| JP | 2016-132186 A | 7/2016 |

OTHER PUBLICATIONS

Office Action dated Jul. 7, 2020 in Japanese Application No. 2016-251729.

* cited by examiner

-- CONVENTIONAL ART --

005 + INTERNAL SETTING DATA REPLACEMENT APPLICATION

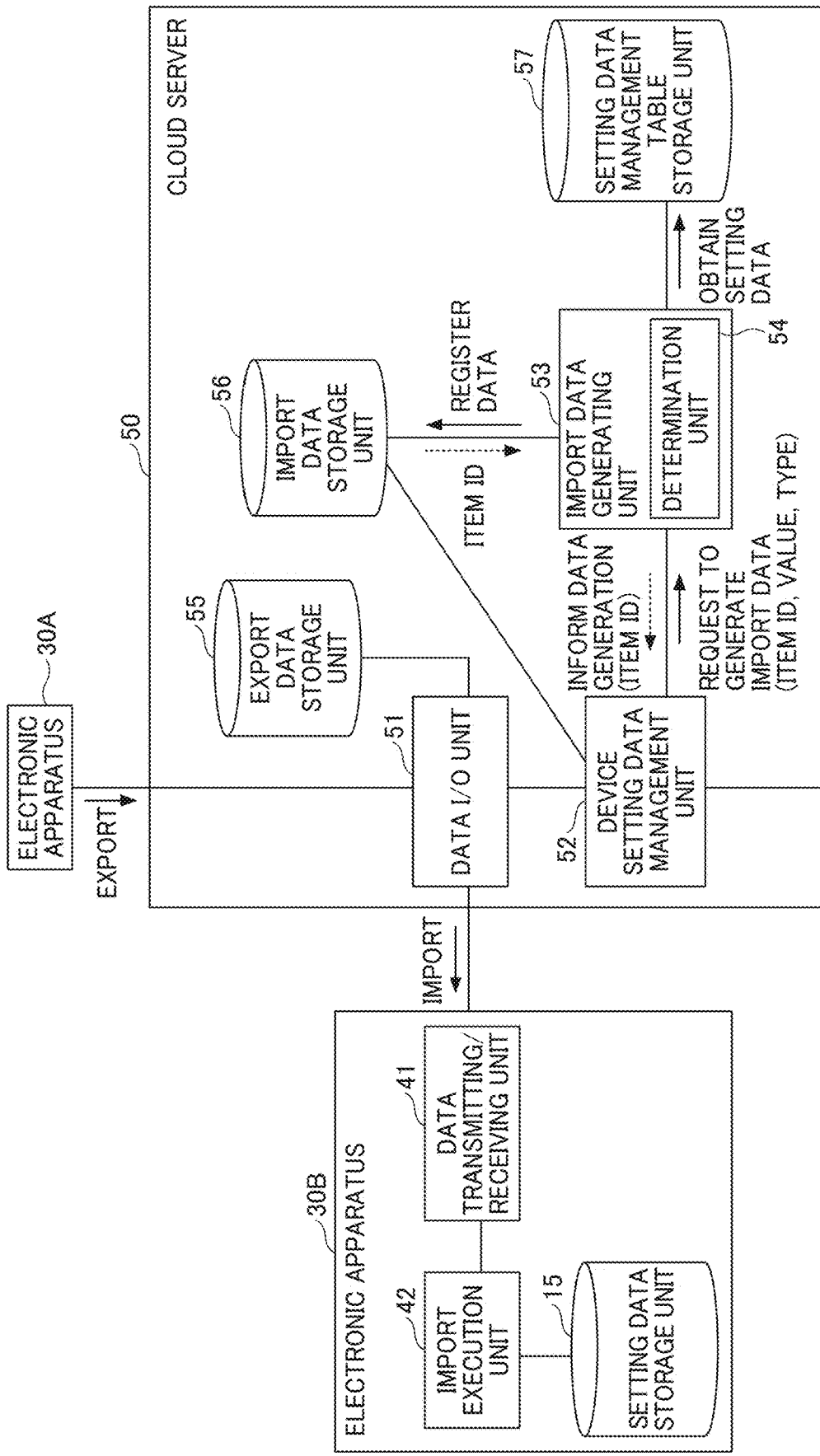

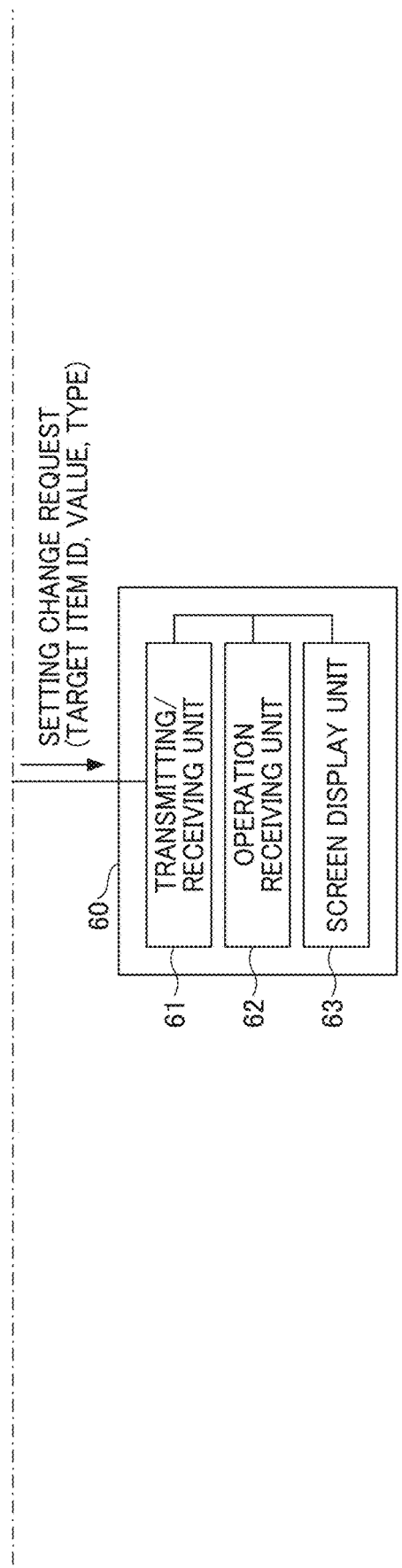

FIG. 19

| MANAGEMENT MODULE | CLASSIFICATION | ITEM NAME | ITEM ID | VALUE |
|---|---|---|---|---|
| INITIAL SETTING (FAX) | RECEPTION SETTINGS | SPECIFIED DESTINATION SETTINGS 1 : DESTINATION : NUMBER OF CHARACTERS | 001 | 24 |
| INITIAL SETTING (FAX) | RECEPTION SETTINGS | SPECIFIED COUNTERPART DESTINATION SETTING 1 : NUMBER OF COPIES OF DOCUMENTS PER COUNTERPART DESTINATION : NUMBER OF COPIES | 005 | 2 |

FIG. 20

| ID | VALUE |
|---|---|
| 000 | 1 |
| 001 | 24 |
| 004 | 2 |
| 005 | 2 |

ELECTRONIC APPARATUS, METHOD FOR ADDING FUNCTION, AND NON-TRANSITORY RECORDING MEDIUM

CROSS-REFERENCE TO RELATED APPLICATION

This patent application is a continuation application of U.S. application Ser. No. 15/850,160, filed on Dec. 21, 2017, issued as U.S. Pat. No. 10,452,457 on Oct. 22, 2019, which is based on and claims priority pursuant to 35 U.S.C. § 119(a) to Japanese Patent Application No. 2016-251729, filed on Dec. 26, 2016, in the Japan Patent Office, the entire disclosure of each of which is hereby incorporated by reference herein.

BACKGROUND

Technical Field

The present disclosure relates to an image forming apparatus, a method for adding functions, and a non-transitory recording medium.

Related Art

Electronic apparatuses often used in companies may be periodically replaced with new ones, because of expiration of lives of the electronic apparatuses or breakdown of the electronic apparatuses. Such an electronic apparatus, which is an old one, is replaced with a new electronic apparatus. When the old electronic apparatus has, for example, a facsimile function, facsimile (FAX) numbers of destinations are set in the old electronic apparatus. Additionally, when the old electronic apparatus has a printing function, various printing conditions are set in the old electronic apparatus. If these various settings mentioned above are not set in the new electronic apparatus when the old electronic apparatus is replaced with the new electronic apparatus, a user may have a negative impression such as decrease in operability.

Such replacement of the electronic apparatus is usually done by a customer engineer, however the customer engineer also finds burdensome to input each piece of the information of the various settings, which is set in the old apparatus, to the new apparatus. In transferring each of the various settings, a service engineer is to take a memo of setting values and also interview a client regarding works, and thereby required to spend a lot of time to replace electronic apparatuses.

However, the replacement usually takes place when the electronic apparatus becomes old, and such an old electronic apparatus, which is usually distributed in a market before the new electronic apparatus, usually does not have a latest design, resulting in a failure in extracting setting data. A manufacturer may change a design of the apparatus distributed in the market in the middle of production run to make the apparatus to be able to extract the setting data. However, such running change of the apparatus distributed in the market has a large risk in a design aspect, because the apparatus has a stable quality.

SUMMARY

An electronic apparatus includes a memory and circuitry. The memory stores a plurality of programs, and program registration information including identification information of the plurality of programs each of which is permitted to be executed in the electronic apparatus. The circuitry executes a first program of the plurality of programs stored in the memory. The circuitry executes a second program according to a determination that the identification information of the program registration information includes identification information of the second program stored in an external memory connectable to the electronic apparatus. The circuitry causes the first program and the second program, which are executed, to be communicable with each other to newly add a function to the electronic apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 15A to 15B (FIG. 15) are a block diagram illustrating one example of a functional configuration of a user personal computer (PC), the cloud server, and an electronic apparatus according to another one of the embodiments (second embodiment);

FIG. 19 is a table in association with a setting change request; and

FIG. 20 is a table in association with import data generated by an import data generating unit.

Figure 1:
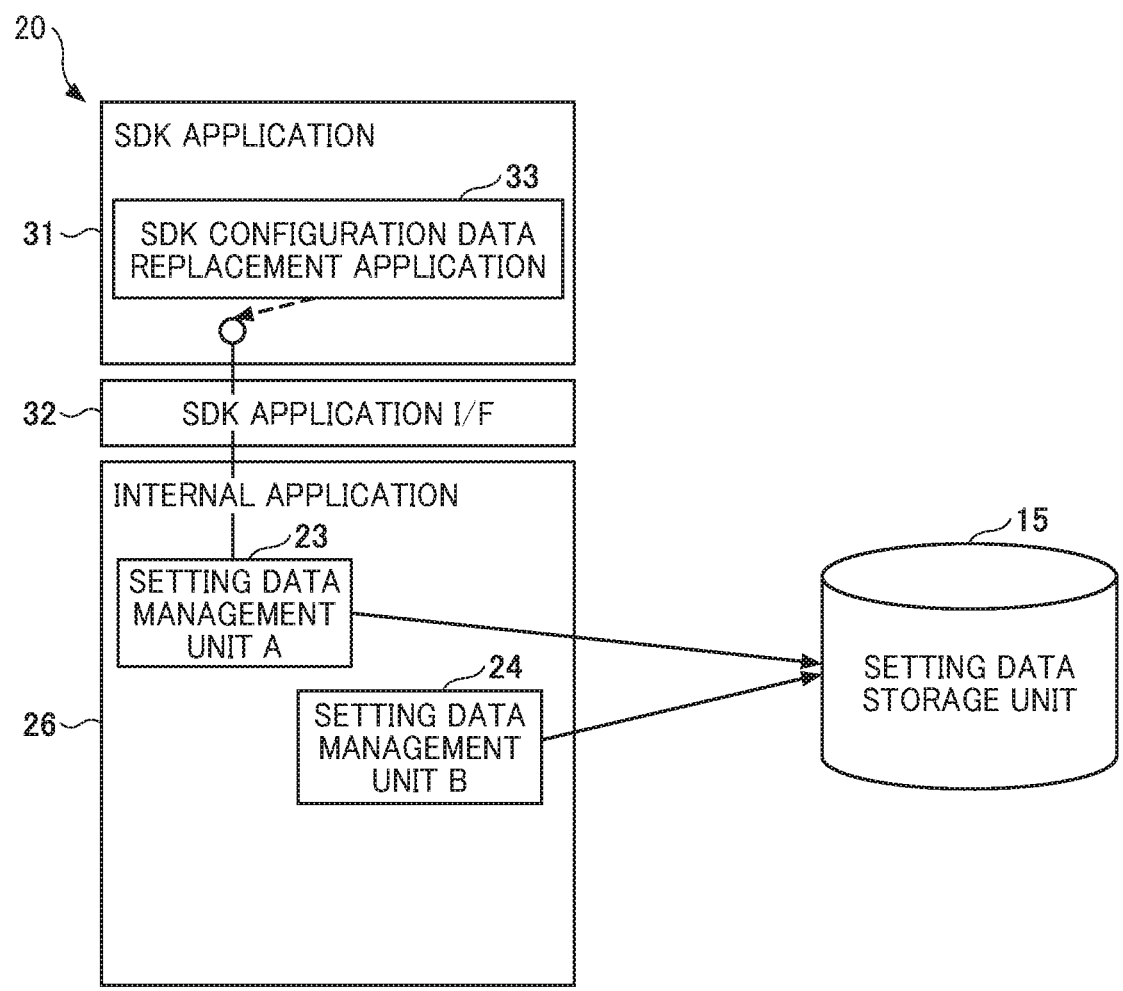
FIG. 1 is a block diagram illustrating a software configuration of an electronic apparatus for explaining inconvenience occurring in extracting setting data.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

An electronic apparatus and a method for adding a new function to current functions of the electronic apparatus are described with reference to the drawings.

First Embodiment

First, inconvenience that occurs when an electronic apparatus 20, which is distributed in a market, is not applicable to extraction of setting data. FIG. 1 is a block diagram illustrating a software configuration of an electronic apparatus 20, for explaining the inconvenience occurring in extracting the setting data. In the electronic apparatus 20, applications including two types of application, an internal application 26 and a software development kit (SDK) application 31, are activated. "SDK" is defined as a software tool having a set of programs and documents required for developing software to be supported with a system. The electronic apparatus 20 includes an SDK application interface (I/F) 32 that is an interface for allowing the SDK application 31 to communicate with the internal application 26. The SDK application I/F 32 is a set of application interfaces (APIs) for calling functions of the internal application 26 (and an operating system (OS) 28). The SDK application 31 calls the functions of the internal application 26 and the OS 28 through the SDK application I/F 32. The SDK application 31 is able to call and utilize the functions of the internal application 26 through the API, and thereby a manufacturer of the electronic apparatus 20 is able to add functions to a product distributed in a market.

The manufacturer, accordingly, produces the SDK application 31 for extracting setting data from the product in the market, and then, for example, a customer engineer CE in a client side installs the SDK application 31 to the product in a market, such as the electronic apparatus 20. This SDK application 31 is referred to as a SDK setting data replacement application 33.

However, not all of the APIs provided with the SDK application I/F 32 correspond to all functions of the internal application 26, resulting in a failure to extract some of the setting data with the SDK setting data replacement application 33. As illustrated in FIG. 1, accessing the setting data requires the internal application 26, which is able to extract corresponding setting data. For example, the internal application 26 has a setting data management unit A (23) and a setting data management unit B (24), each of which is able to extract corresponding setting data, which is determined in advance by, for example, a designer.

TABLE 1

| Setting Data | Setting Data Management Unit | Presence of SDK Application I/F |
|---|---|---|
| Application A Initial Setting 1 | Application A | Presence |
| Application A Initial Setting 2 | Application A | Presence |
| Application B Initial Setting 1 | Application B | Presence |
| Application B Initial Setting 2 | Application B | Absence |
| Application B Initial Setting 3 | Application B | Presence |
| Application C Initial Setting 1 | Application C | Absence |
| Application C Initial Setting 2 | Application C | Absence |
| Application C Initial Setting 3 | Application C | Absence |
| . . . | . . . | . . . |

Table 1 illustrates correspondence between "setting data", "setting data management unit" and "presence of the SDK application I/F 32". As illustrated in Table 1, each setting data management unit is accessible to the corresponding setting data. Additionally, the presence of the SDK application I/F 32 varies according to a combination of the setting data management unit and the setting data. The SDK application I/F 32, accordingly, is not always compatible with the all of the setting data to be transferred (for data migration).

For example, when the SDK application I/F 32 illustrated in FIG. 1 provides an API for calling the setting data management unit A 23 but not an API for calling the setting data management unit B 24, the SDK setting data replacement application 33 fails to extract the setting data that is to be extracted with the setting data management unit B 24. Adding the API for calling the setting data management unit B 24 to the SDK application I/F 32 by the manufacturer is also difficult because the electronic apparatus 20 has been already distributed in the market.

<Operation of Electronic Apparatus According to One of Embodiments>

Figure 2:
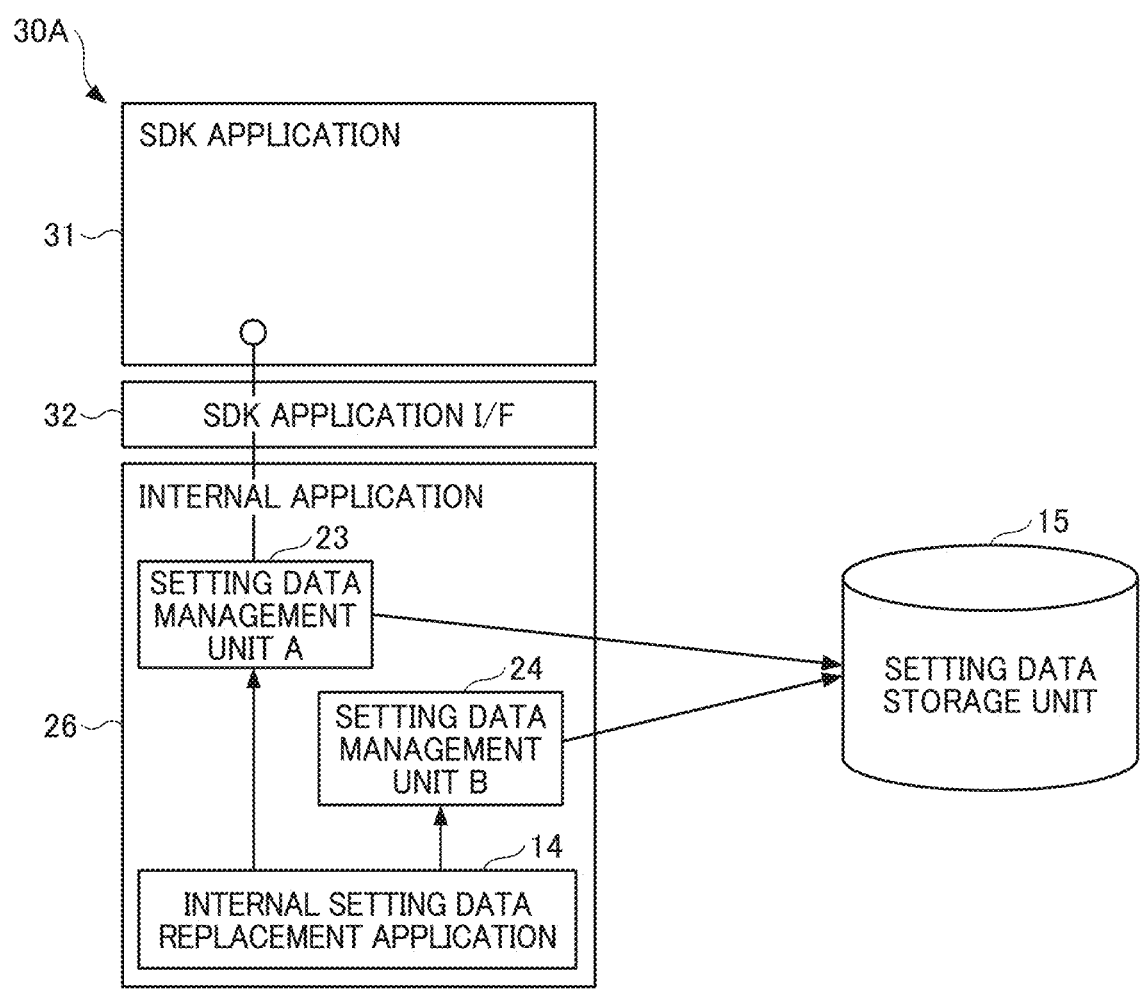
FIG. 2 is a schematic block diagram for explaining operation of an electronic apparatus according to one of the embodiments of the disclosure.

An electronic apparatus 30A according to one of embodiments of the disclosure has an internal setting data replacement application 14 activating as the internal application 26. FIG. 2 is a block diagram illustrating a software configuration of the electronic apparatus 30A, for explaining an example of operation of the electronic apparatus 30A. The internal setting data replacement application 14 serves as the internal application 26, and operates in a memory space that is the same as a memory space in which the setting data management unit A 23 and the setting data management unit B 24 operate. The internal application 26 does not pass data through the SDK application I/F 32, so that the internal setting data replacement application 14 is able to use all functions of the setting data management unit A 23 and the setting data management unit B 24. More specifically, the internal setting data replacement application 14 calls functions that are not provided with the SDK application I/F 32 from the internal application 26 and obtains the setting data from the internal application 26.

With installation of the internal setting data replacement application 14, the new functions that have been unable to be obtained as described with reference to FIG. 1 are added.

A general-purpose personal computer (PC) is also able to install application software, however, the electronic apparatus 30A according to the embodiment has a type of application software that is unable to be installed. A detailed description of this is given later.

Terms

A "program that is permitted to be executed", here, means a program that is able to be executed or activated in the electronic apparatus 30, or used by a user.

A "function", here, indicates specific contents of processing information, performed by the electronic apparatus 30. The "function" is provided as a combination of two or more types of processing including inputting, data-processing, and outputting.

"Setting data" is data set in the electronic apparatus 30. A type of the "setting data" varies depending on a type of the electronic apparatus 30. The types of the setting data include, for example, address information, and process parameter.

<Example of System Configuration>

Figure 3:
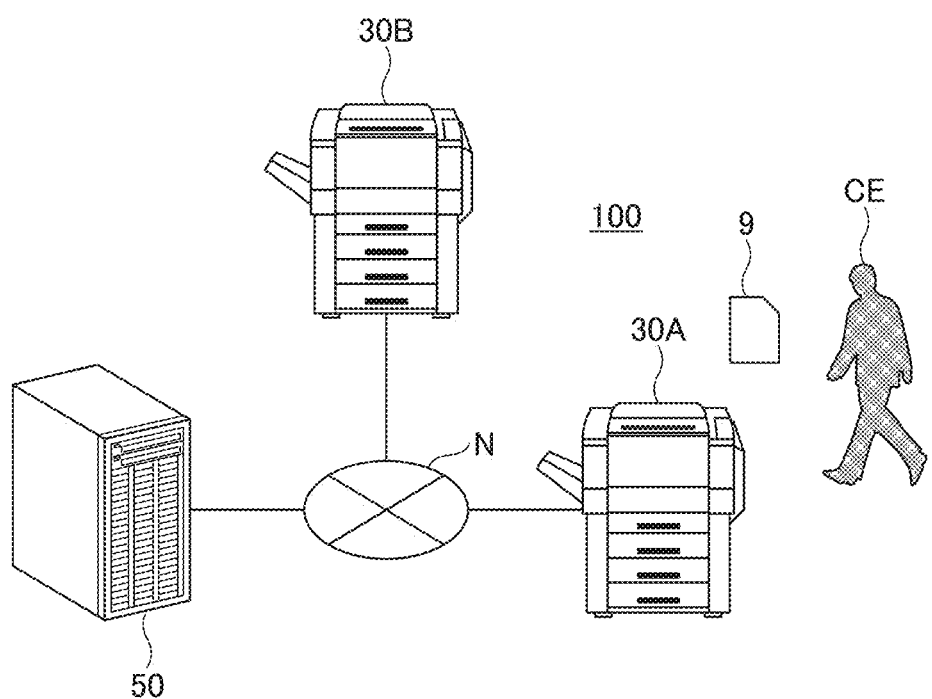
FIG. 3 is an illustration of a configuration of a data setting system according to one of the embodiments.

FIG. 3 is an illustration of a configuration of a data setting system 100. The data setting system 100 includes one or more electronic apparatuses 30A and 30B and a cloud server 50, which are communicable to each other through a network N. Hereinafter, an arbitrary electronic apparatus of the plurality of electronic apparatuses 30A and 30B is referred to as the electronic apparatus 30.

The network N is built, for example, with a local area network (LAN) set in an institution or the like where the electronic apparatuses 30A and 30B are set, a provider network provided by a provider that connects the LAN to the Internet, or a line provided by a carrier. When the network N has a plurality of LANs, the network N is called a wide area network (WAN) or the Internet. The network N is configured as one or both of a wired network and a wireless network. Additionally, when directly connecting to a public line network, the electronic apparatus 30A connects to the provider network without using the LAN.

The electronic apparatus 30A is set with the setting data in association with the operation, and the electronic apparatus 30B is an apparatus that is to reuse the setting data. Here, the electronic apparatus 30A corresponds to an old apparatus that is to be replaced with a new apparatus in a company. On the other hand, the electronic apparatus 30B corresponds to the new apparatus in which the setting data is reused. The electronic apparatus 30A (first image forming apparatus) exports the setting data to the cloud server 50 and then the electronic apparatus 30B (second image forming apparatus) imports the setting data. The electronic apparatus 30B is described in detail later in a description of a second embodiment.

Examples of the electronic apparatus 30A include a multifunction peripheral (MFP), a projector, an electronic whiteboard, and a videoconference terminal. The multifunction peripheral is referred to as a MFP, a copier, an image forming apparatus, an image processing apparatus, a printer, or the like. The projector may be referred to as a projecting apparatus. The electronic whiteboard may be referred to as electronic information board or the like. Additionally, in some of the embodiments, the electronic apparatus 30A is a digital signage, a digital camera, or a drone.

Furthermore, the electronic apparatus 30A may be an apparatus in which the setting data is not to be set, as long as the electronic apparatus 30A is able to add functions to the product distributed in the market without using the SDK application 31.

Additionally, an application to be added (internal setting data replacement application 14) is distributed with a portable storage medium 9 by being stored in the portable storage medium 9. When the customer engineer CE connects the portable storage medium 9 to the electronic apparatus 30A, the electronic apparatus 30A reads and installs the internal setting data replacement application 14 to the electronic apparatus 30A. A detailed description of the above-mentioned installation is described later. The portable storage medium 9 is, for example, a secure digital (SD) card (registered trademark), a universal serial bus (USB) memory, a compact flash (registered trademark), a multimedia card, a floppy, a memory stick (registered trademark), a hard disk drive externally connected, or the like.

In some of the embodiments, the internal setting data replacement application 14 is stored in a server for distributing programs. In this case, the customer engineer CE downloads the internal setting data replacement application 14 to the electronic apparatus 30A from the server for distributing programs.

The cloud server 50 is an information processing apparatus on a cloud to which the setting data obtained by the internal setting data replacement application 14 is transmitted. To "export", here, indicates that the internal setting data replacement application 14 obtains the setting data from the electronic apparatus 30A, or, the internal setting data replacement application 14 transmits the setting data obtained from the electronic apparatus 30A to the cloud server 50. To "import", here, indicates that the electronic apparatus 30B, which is the new apparatus to be replaced with the old one, downloads the setting data from the cloud server 50, or the electronic apparatus 30B sets the setting data. The setting data to be exported is referred to as export data, and the setting data to be imported is referred to as import data. Namely, the setting data may be the same as the import data or the export data.

Additionally, the "cloud", here indicates cloud computing that is a utilization form in which resources on the network are used without identifying specific hardware resources. In some of the embodiments, the cloud server 50 is an internal network used within a company.

<Example of Hardware Configuration>

<<Hardware Configuration of Multifunction Peripheral>>

Figure 4:
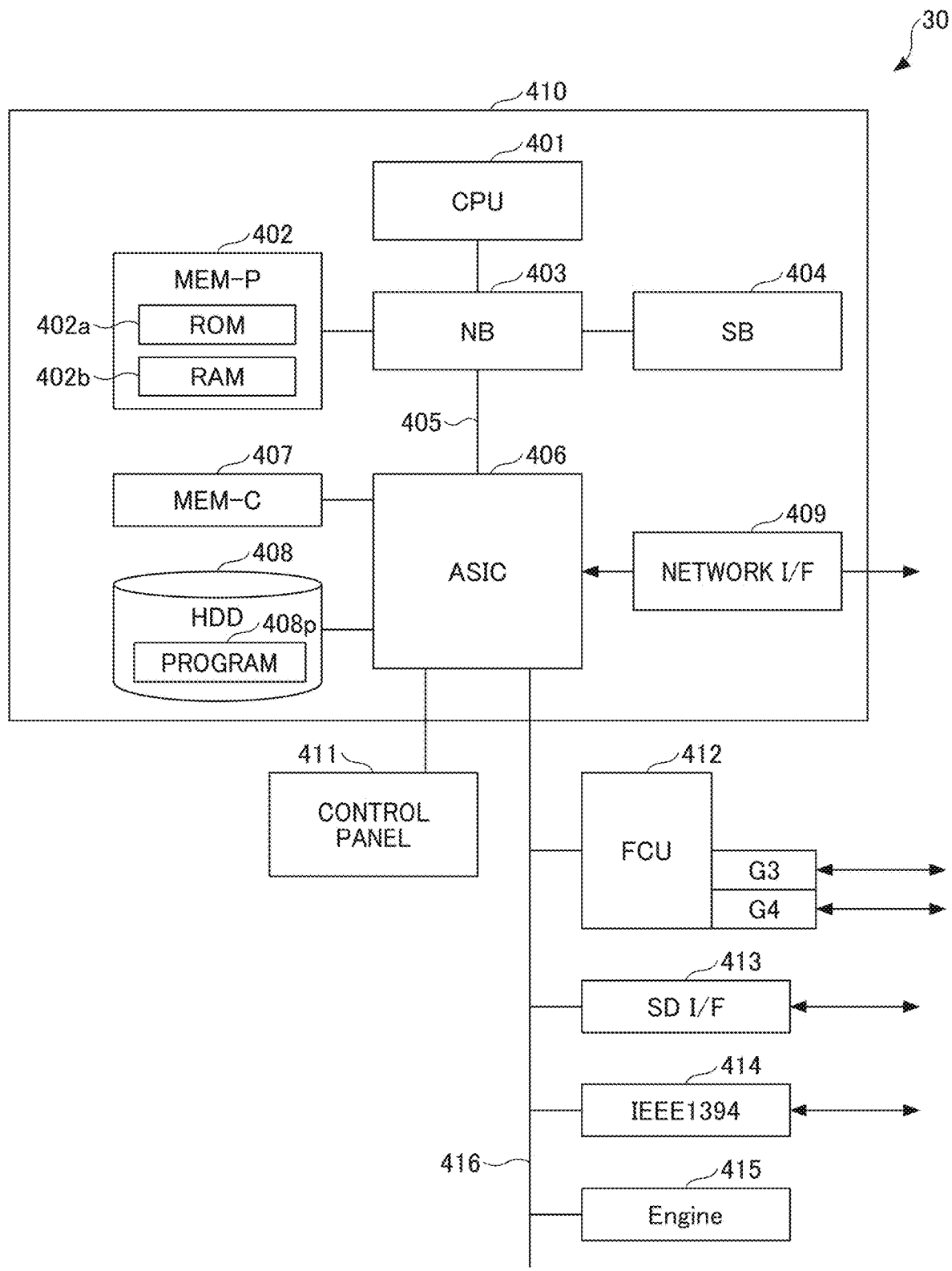
FIG. 4 is a schematic block diagram illustrating one example of a hardware configuration of a multifunction peripheral (MFP) according to one of the embodiments.

FIG. 4 is a schematic block diagram illustrating one example of a hardware configuration of the electronic apparatus 30. In the description of the embodiments a multifunction peripheral (MFP) is used as an example of the electronic apparatus 30 to describe the hardware configuration. The MFP 30 includes a controller 410 and an engine 415 that are connected to each other through a Peripheral Component Internet (PCI) bus 416.

The controller 410 controls overall operation of the MFP 30, such as drawing and communicating, and also controls inputs from a control panel 411 (display and input device). The engine 415 is, for example, a printer engine that is connectable to the PCI bus 416, and includes a white black plotter, a one-drum color plotter, a four-drum color plotter, a scanner, and a fax unit.

The engine 415 also includes an image processing section that performs image processing such as error diffusion and gamma conversion, in addition to an engine section such as a plotter.

The controller 410 includes a CPU 401, a north bridge (NB) 403, a system memory (MEM-P) 402, a south bridge (SB) 404, a local memory (MEM-C) 407, an Application Specific Integrated Circuit (ASIC) 406, and an HDD 408, and the NB 403 and the ASIC 406 are connected to each other through an Accelerated Graphics Port (AGP) bus 405.

The MEM-P 402 further includes a read only memory (ROM) 402a and a RAM 402b.

The CPU 401 controls overall operation of the MFP 30. The CPU 401 is connected to another device via a chip set including the NB 403, the MEM-P 402, and the SB 404.

The NB 403 is a bridge that connects among the CPU 401, the MEM-P 402, the SB 404, and the AGP bus 405, and includes a memory controller that reads from or writes to the MEM-P 402 and a Peripheral Component Interconnect (PCI) master, and an AGP target.

The MEM-P 402 is a system memory that is used as, for example, a memory storing a program and data, a working memory for a program or data, or a memory for drawing with a printer, and includes the ROM 402a and the RAM 402b.

The ROM 402a, which is readable, is used for storing a program and data, and the RAM 402b, which is readable and writable, is used as a working memory for the program and the data or used as a drawing memory used with the printer.

The SB 404 is a bridge that connects the NB 403 to a PCI device and a peripheral device. The SB 404 is also connected to the NB 403 through a PCI bus, and the PCI is also connected to a network interface (I/F) 409. The ASIC 406 is an integrated circuit (IC) dedicated to an image processing use with hardware, and connects the AGP bus 405, the PCI bus 416, the HDD 408, and the MEM-C 407.

The ASIC 406 includes a PCI target, an AGP master, an arbiter (ARB), which is a core or the ASIC 406, a memory controller that controls the MEM-C 407, a plurality of direct memory access controllers (DMACs) capable of rotating image data with a hardware logic, and a PCI unit that transfers data with the engine 415 through the PCI bus.

The network I/F 409 is a communication device, such as a Network Interface Card (NIC), to communicate with the cloud server 50 through a network.

The ASIC 406 is connected to a facsimile control unit (FCU) 412, a secure digital interface (SD I/F) 413, and the Institute of Electrical and Electronics Engineers 1394 (IEEE 1394) interface 414 through the PCI bus.

The control panel 411 is directly connected to the ASIC 406. The MEM-C 407 is a local memory that is used as a copy image buffer or a code buffer. The HDD 408 is a storage that stores image data, a program, font data, and a form.

The HDD 408 saves a license file of an application executed with the MFP 30. The AGP bus 405 is a bus interface for a graphics accelerator card that is devised for accelerating graphic processing, and accelerates the graphics accelerator card by directly accessing the MEM-P 402 with high throughput.

<<Hardware Configuration of Cloud Server>>

Figure 5:
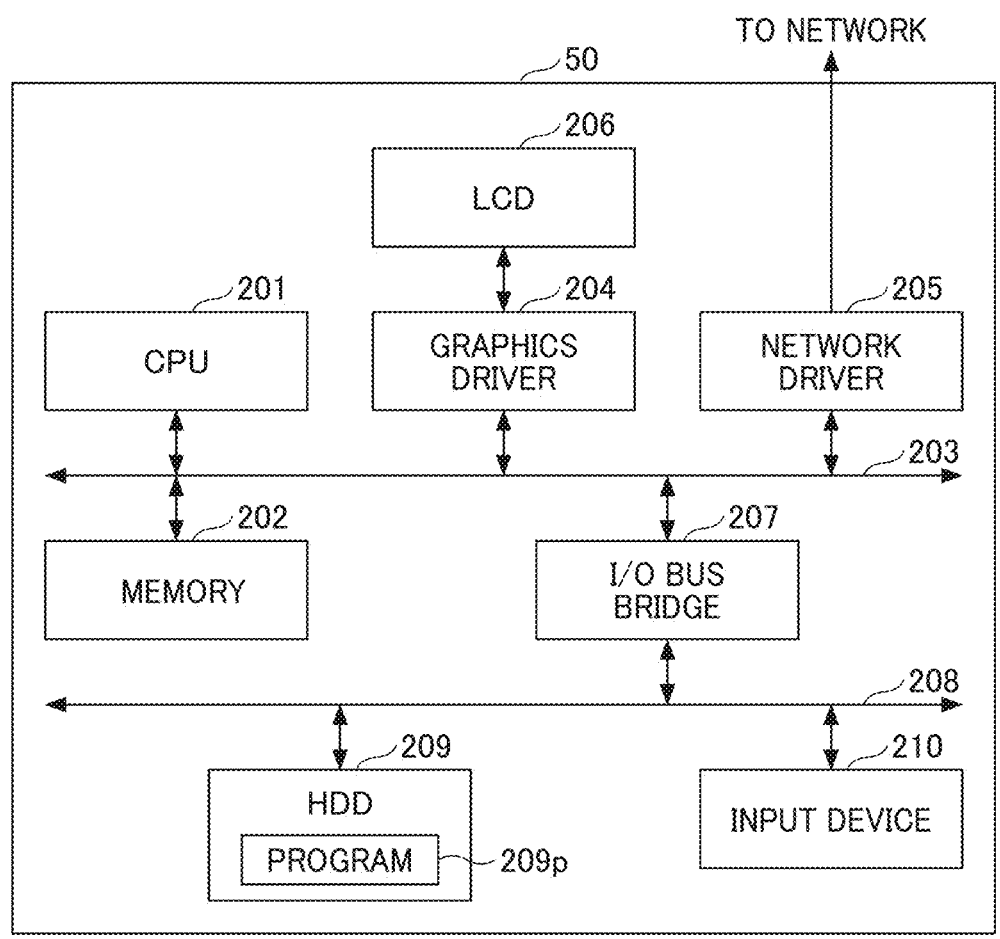
FIG. 5 is a schematic block diagram illustrating an example of a hardware configuration of a cloud server according to one of the embodiments.

FIG. 5 is a diagram illustrating an example of the hardware configuration of the cloud server 50. The cloud server 50 includes a central processing unit (CPU) 201 and a memory 202 that enables high-speed access to data used by the CPU 201. The CPU 201 and the memory 202 are connected to other devices or drivers of the cloud server 50, such as a graphics driver 204 and a network driver (NIC) 205, via a system bus 203.

The graphics driver 204 is connected to a liquid crystal display (LCD) 206 as an example of display device via a bus. The graphics driver 204 monitors a processing result by the CPU 201. Further, the network driver 205 connects the cloud server 50 to the network N at a transport layer level and a physical layer level to establish a session with the multifunction peripheral 30, for example.

An input/output (I/O) bus bridge 207 is further connected to the system bus 203. On the downstream side of the I/O bus bridge 207, a storage device such as a hard disc drive (HDD) 209 is connected via an I/O bus 208 such as a peripheral component interconnect (PCI), in compliance with integrated device electronics (IDE), an advanced technology attachment (ATA), an AT attachment packet interface (ATAPI), serial ATA, a small computer system interface (SCSI), a USB, etc. The HDD 209 stores a program 209p for controlling overall operation of the cloud server 50. In some of the embodiments a solid state drive (SSD) is used instead of the HDD 209.

An input device 210 such as a keyboard and a mouse (called a pointing device) is connected to the I/O bus 208 via a bus such as a USB. The input device 210 accepts inputs or instructions by an operator such as a system administrator.

The hardware configuration of the cloud server 50 is not necessarily housed in one housing nor provided as apparatus of one unit as illustrated in FIG. 5. In addition, in order to support the cloud computing, a physical configuration of the cloud server 50 of the present embodiment is not necessarily fixed. In other words, hardware resources may be dynamically connected/disconnected to constitute the cloud server 50.

<Functions>

Figure 6:
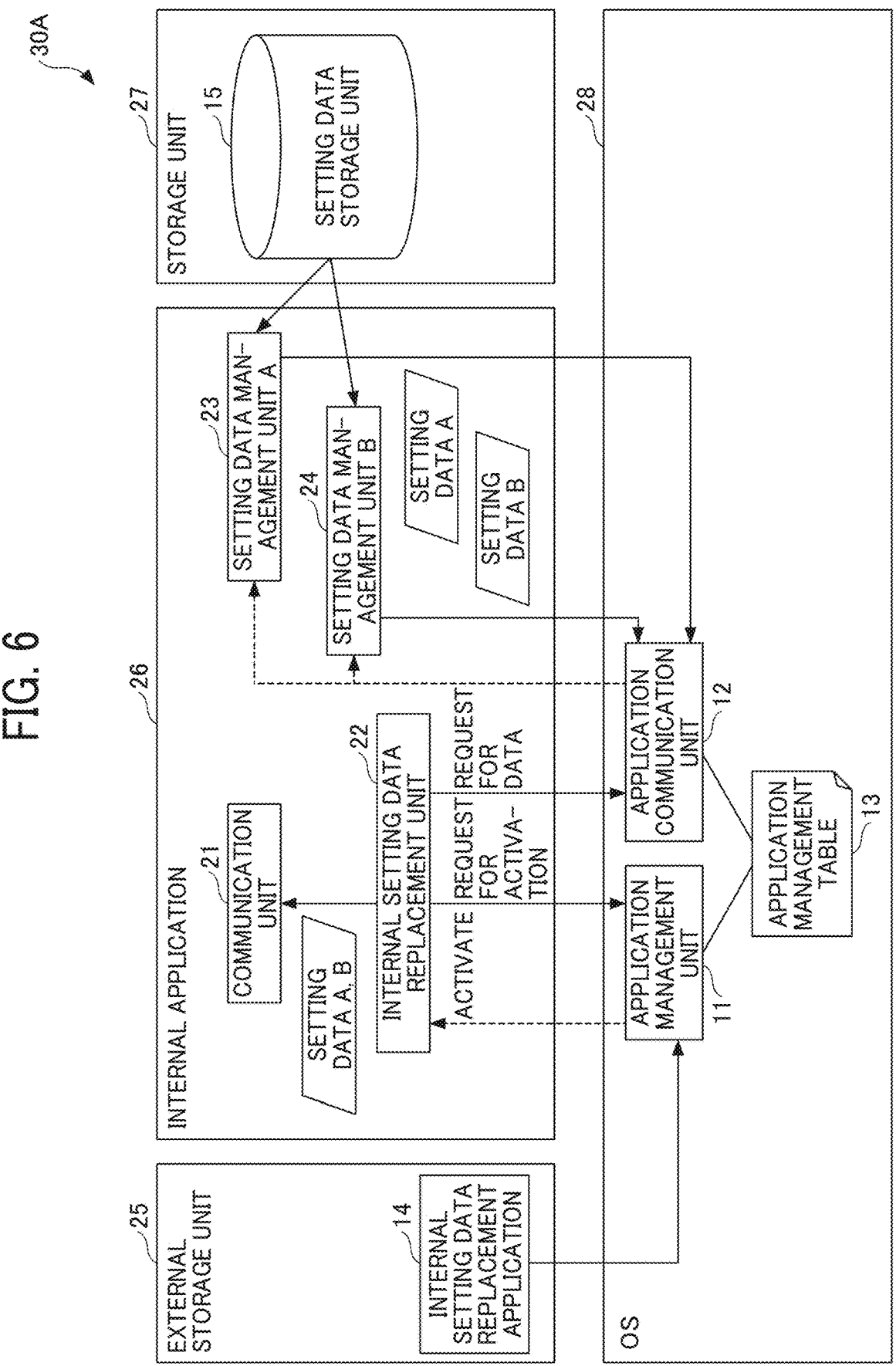
FIG. 6 is a block diagram illustrating a functional configuration of the electronic apparatus according to one of the embodiments.

FIG. 6 is a block diagram illustrating a functional configuration of the electronic apparatus 30A. The electronic apparatus 30A includes an external storage unit 25, an internal application 26, a storage unit 27, and an OS 28. The external storage unit 25 stores data onto the portable storage medium 9 attached to the electronic apparatus 30A. The portable storage medium 9 is attached to the SD I/F 413 by a service engineer. The CPU 401 detects attachment of the portable storage medium 9 by an interruption and executes an interruption program associated with this interruption. For example, the interruption program is a program for searching files in the portable storage medium 9 for detecting a file having a predetermined extension as an application. When detecting the application in executing the interrupt program, the detection of the application is reported to an application management unit 11 of the OS 28. As described above, the OS 28 detects the application stored in the external storage unit 25. In the description of the embodiment, the internal setting data replacement application 14 is detected. In some of the embodiments, the service engineer operates to activate the internal setting data replacement application 14.

The storage unit 27 is implemented with one or more of the HDD 408, the MEM-P 402, and the MEM-C 407, and stores data therein. The storage unit 27 include a setting data storage unit 15 to store the setting data. The setting data is stored in a non-volatile storage area. The non-volatile storage area is defined as an area for storing data that is to be protected and not deleted even when the power supply is turned off. An example of the setting data is described later.

The electronic apparatus 30A includes the internal setting data replacement unit 22, the setting data management unit A (23), the setting data management unit B (24), and a communication unit 21, each of which operates as internal applications 26. Each unit in the internal application 26 is functions or means that is implemented by operating any of the hardware components illustrated in FIG. 4 in accordance with an instructions from the CPU 401 according to a program 408*p* (application) expanded from the HDD 408 to the RAM 402*b*.

The setting data management unit A (23) reads setting data A from the storage unit 27 and sets the setting data A. The setting data management unit A (23) is implemented with an application created by the manufacturer of the electronic apparatus 30A for reading and writing of the setting data A. Similarly, the setting data management B reads setting data B from the storage unit 27 and sets the setting data B. The setting data management unit B is implemented with an application created by the manufacturer of the electronic apparatus 30A for reading and writing of the setting data B. Each of the setting data A and the setting data B is readable and writable with a corresponding dedicated application, which is the setting data management unit A (23) and the setting data management unit B (24), respectively, resulting in high security of the setting data. The number of the setting data management units is not limited to two as in the embodiment, which includes the setting data management unit A (23) and the setting data management unit B (24), and in some of the embodiments, more than two setting data management units are used.

The internal setting data replacement unit 22 is implemented using the internal setting data replacement application 14. The internal setting data replacement unit 22 acquires the setting data from the setting data storage unit 15 of the storage unit 27 using the setting data management unit A 23 and the setting data management unit B 24. A detailed description of acquisition of the setting data is deferred with reference to FIG. 8.

The internal application 26 operates on the OS 28. The OS 28 is a program that provides an abstract interface for each function of the hardware of the information processing apparatus to the application. The OS 28 is also referred to as basic software. The internal application 26 utilizes the hardware in accordance with a regulation and procedure provided by the OS 28. When the electronic apparatus 30A executes the internal application 26, the OS 28 executes each unit of the internal application 26 as a process. The OS 28 assigns resources such as a memory space to each process and loads a binary code of the internal application 26 into a memory (RAM). The OS 28 also identifies each process and protects each process from the other processes. The OS 28 has a function called a scheduler that determines an order of processes performed by the CPU 401 and a period of time for performing the processes at one time, and causes the CPU 401 to be occupied with selected processes, and executes the internal application 26 for each process. Switching of the internal application 26 is referred to as context switching, and the OS 28 evacuates and restores a state of a register of the CPU 401. As described above, the OS 28 executes a plurality of applications in the internal applications 26 in parallel.

The OS 28 according to the embodiment includes the application management unit 11 and an application communication unit 12. Additionally, the OS 28 has an application management table 13. The application management table 13 is stored in one of the HDD 408, the MEM-P 402, and the MEM-C 407, for example. The application management table 13 is encrypted to be accessed by the OS 28 in the embodiment, but this is not limiting. The application management table 13 is described with reference to Table 2.

TABLE 2

| Application ID | Application Name |
|---|---|
| 001 | Copy Application |
| 002 | Print Application |
| 003 | FAX Application |
| 004 | Scanner Application |
| 005 | Process Application |

Table 2 is an example of the application management table 13. In the application management table 13, an application name that is permitted to be executed in the electronic apparatus 30 is registered in association with an application ID. For example, the application ID of 001 has an application name, "copy application". There are a copy application, a print application, a FAX application, and a scanner application are applications that the user of the electronic apparatus 30A may use, and there is a process application that is not used by the user. The process application is an application for writing the setting data in the storage unit 27 using the setting data management unit A 23 and the setting data management unit B 24 in the same way as the internal setting data replacement application 14. The process application is used by a person in charge in a factory or the like before or at a time of shipment of the electronic apparatus 30A to set the setting data in the electronic apparatus 30A. That is, the process application is an application for setting initial values of the setting data at the time of shipment.

After shipment, the user hardly uses the process application. That is, the process application is used at the time of shipment of the electronic apparatus 30A and is not used after the shipment. In the present embodiment, utilizing this fact, the application ID of the process application is given to the internal setting data replacement application 14. The application management unit 11, accordingly, is able to activate the internal setting data replacement application 14.

ID is an abbreviation of identification and means an identifier or identification information. ID is one of, or a combination of two or more of a name, a code, a character string, and a numeral value, and used for uniquely distinguishing a specific target from a plurality of targets. The same applies to other IDs than the application ID.

The application management unit 11 activates each application having a corresponding application name registered in the application management table 13. The application management unit 11 is unable to activate an application having an application ID that is not registered in the application management table 13.

The application communication unit 12 provides functions of establishing communication among different applications (inter-process communication). In the present embodiment, the internal setting data replacement unit 22 communicates with the setting data management unit A 23 and the setting data managing unit B 24 to acquire the setting data.

The communication unit 21 transmits the setting data A and the setting data B acquired by the internal setting data replacement unit 22 to the cloud server 50. An internet protocol (IP) address of the cloud server 50 is set in the internal setting data replacement unit 22 in advance.

<Inter-Process Communication>

Figure 7:
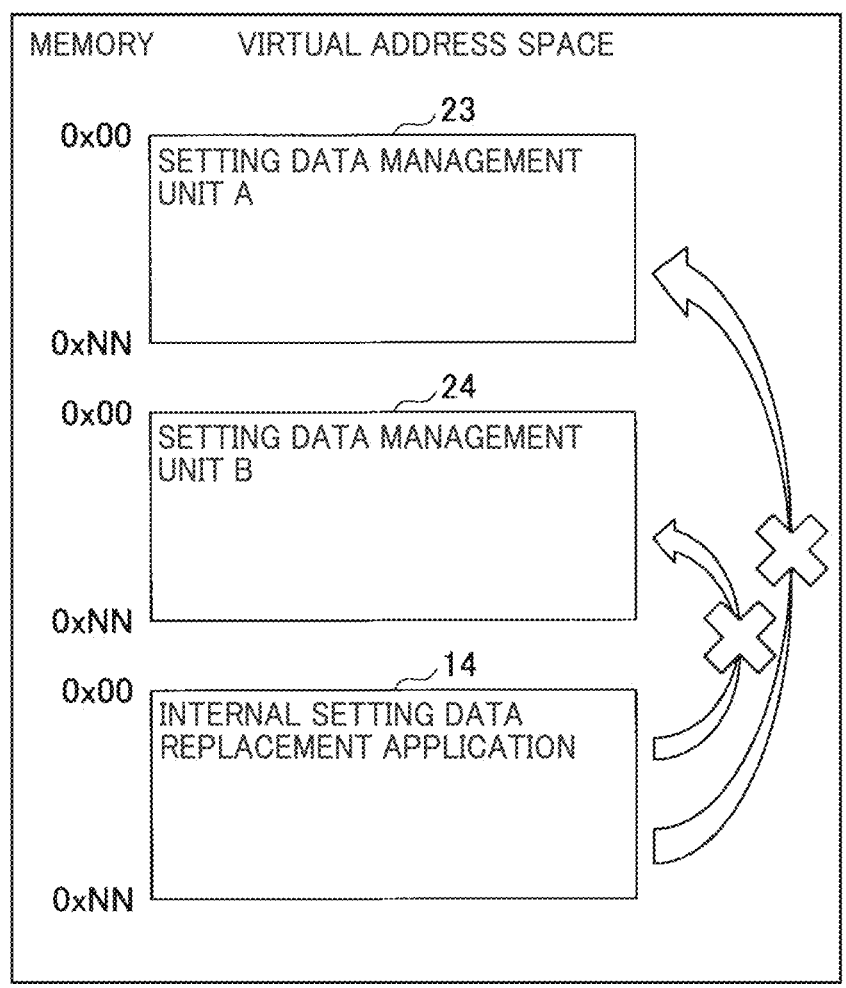
FIG. 7 is a schematic diagram illustrating applications loaded in a memory.

FIG. 7 is a schematic diagram illustrating each of applications loaded in a memory. The memory is implemented by, for example, the RAM 402*b* illustrated in FIG. 4. A dedicated virtual address space is assigned to a process running, and instructions are loaded sequentially from address 0. A physical address for each process is not necessary to be identified, and each process accesses a range of a corresponding virtual address. That is, each process is unable to access the other physical addresses with which the other processes are stored.

A mechanism of the inter-process communication is, accordingly, prepared for the information processing apparatus. The inter-process communication is a mechanism that provides a function of sharing information and exchanging messages among a plurality of processes. More specifically, examples of the inter-process are implemented as or by a shared memory, synchronization, message communication, and the like.

Figure 8:
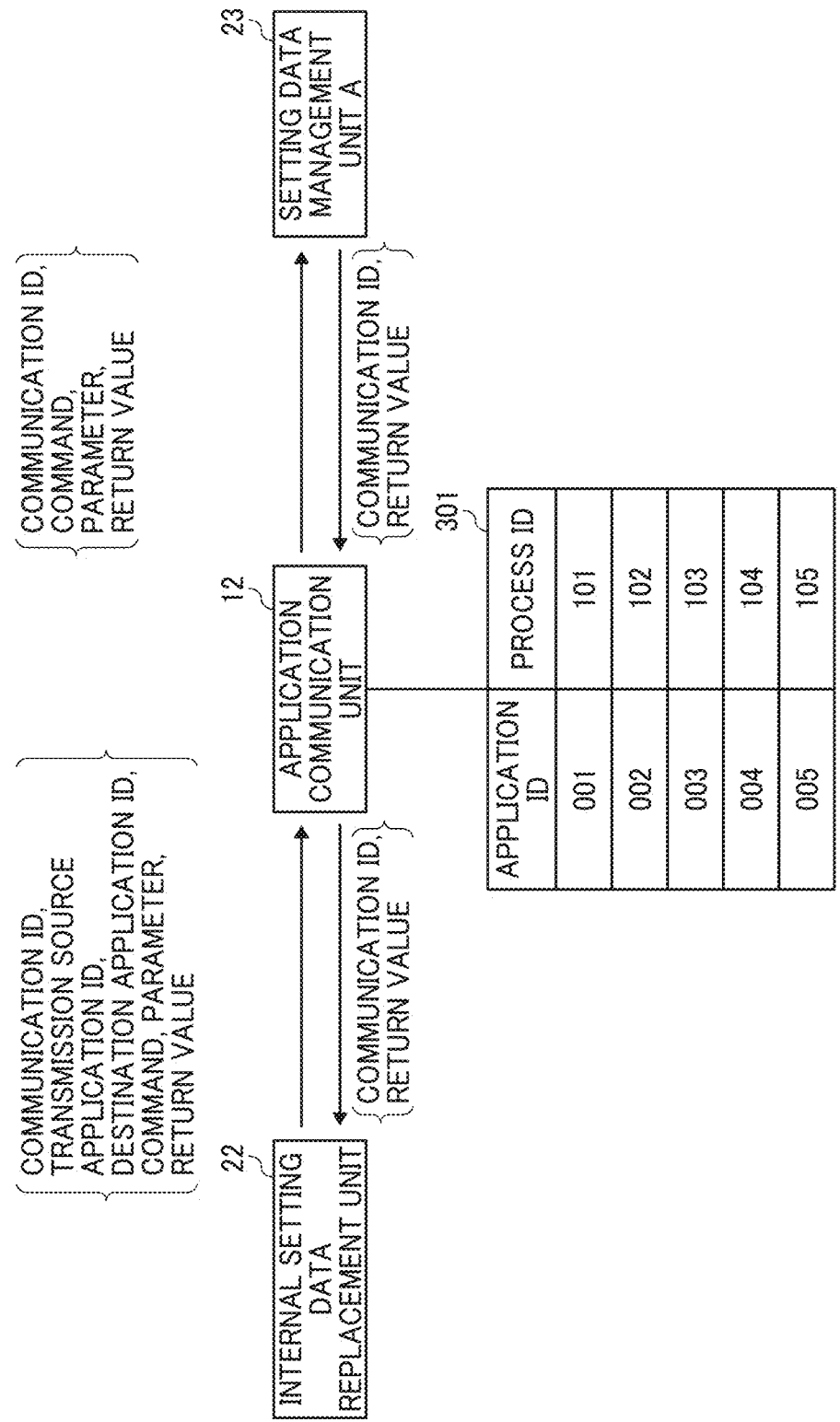
FIG. 8 is a schematic diagram illustrating an inter-process communication.

FIG. 8 is a schematic diagram illustrating the inter-process communication. (1) The internal setting data replacement unit 22 transmits a communication ID, a transmission source application ID, a destination application ID, a command, a parameter, and a return value to the application communication unit 12. More specifically, these are stored in a description format (data structure) provided by the application communication unit 12, and the internal setting data replacement unit 22 calls the application communication unit 12. The communication ID is identification information for identifying one inter-process communication. (2) The application communication unit 12 holds a table 301 in which an activated application ID is associated with a corresponding process ID. Each transmission source application ID is stored in association with a corresponding communication ID. The application communication unit 12 transmits the communication ID, the command, the parameter, and the return value to a process identified with the process ID associated with the destination application ID. (3) The setting data management unit A 23 executes an instruction according to the command and the parameter, and stores a result obtained by executing the instruction in the return value. The execution result according to the embodiment is the setting data acquired from the setting data storage unit 15. The setting data management unit A 23 transmits the communication ID and the return value to the application communication unit 12. (4) The application communication unit 12 specifies the transmission source application ID associated with the communication ID, and specifies the process ID associated with the transmission source application ID. The application communication unit 12 transmits the communication ID and the return value to the internal setting data replacement unit 22 identified with the process ID.

The internal setting data replacement unit 22 specifies which setting data the return value is with the communication ID and acquires the requested setting data. The inter-process communication method illustrated in FIG. 8 is merely an example and may be realized by any other method.

The electronic apparatus 30A is often installed with the internal application 26 before the internal setting data replacement application 14 is added from the outside, and the internal setting data replacement application 14 often requires the function of the internal application 26 to use the functions of the electronic apparatus 30A. In the present embodiment, the internal setting data replacement unit 22 is able to acquire the setting data using the inter-process communication.

<Application ID of Internal Setting Data Replacement Application 14>

The internal setting data replacement application 14 is required to have an application ID that is registered in the application management table 13, but not usable in a user side. This allows the application management unit 11 to execute the internal setting data replacement application 14. In the embodiment, the internal setting data replacement application 14 is to have the application ID of the process application (005), as described above.

Figures 9, 10:
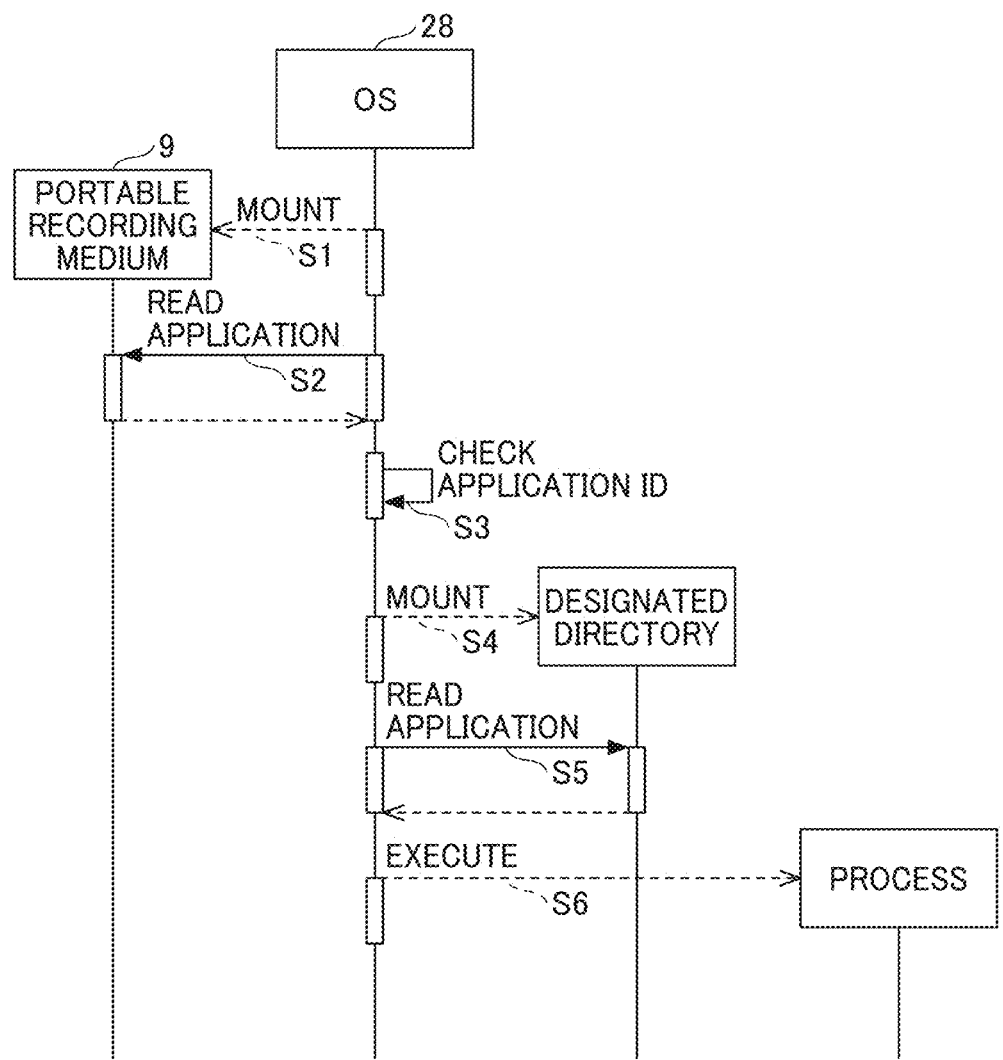
FIG. 9 is a diagram illustrating an example of an application ID belonging to an internal setting data replacement application according to one of the embodiment.
FIG. 10 is a sequence diagram illustrating an example of operation of activating the internal setting data replacement application by an application management unit.

FIG. 9 is a diagram illustrating an example of the application ID of the internal setting data replacement application 14. Referring to FIG. 9, the file name of the internal setting data replacement application 14, "005+internal setting data replacement application" has the application ID of the process application (005). The application management unit 11 retrieves the application ID according to the description format of the file name (for example, obtaining application ID having a predetermined number of characters from a head), and determines whether the retrieved application ID is registered in the application management table 13.

In some of the embodiments, the internal setting data replacement application 14 has the application ID as metadata, or the application ID is stored in a specific space in the internal setting data replacement application 14.

<Setting Data>

The setting data obtained with the setting data management unit A 23 and the setting data management unit B 24 is described below.

(i) Setting data that is obtainable through the SDK application I/F 32

Address Book: Information on user name, phone number, email address, etc., which are associated with each other Print Position of Header and Footer: Print positions of a page number, a date, etc.

(ii) Setting data that is not obtainable through SDK application I/F 32

Energy saving setting value: A transition time to an energy saving mode

Debug log setting value: Log for debugging the electronic apparatus 30A, in which events occurred in the electronic apparatus 30A are recorded Setting Value for Order of Paper Feed Trays: A setting value that specifies a priority order of paper feed trays for us Using the internal setting data replacement application 14, the setting data (ii), which is conventionally unobtainable with the SDK application I/F 32, but manually retrieved by the customer engineer CE, becomes obtainable. Additionally the number of processes to obtain the setting data (ii) with the internal setting data replacement application 14 is fewer than that by the customer engineer CE.

<Activation Process of Internal Setting Data Replacement Application 14>

FIG. 10 is a sequence diagram illustrating an example of operation of activating the internal setting data replacement application 14 by the application management unit 11.

S1: When the portable storage medium 9 is attached to the SD I/F 413, the OS 28 mounts the portable storage medium 9. Here, "mount" means that the OS 28 detects a peripheral device, an external storage device or the like connected to the electronic apparatus 30A (computer) so as to make such a device usable (for example, assigning non-redundant drive letters or assigning directories).

S2: By interruption as described above, the application management unit 11 reads an object of the internal setting data replacement application 14 stored in the portable storage medium 9 mounted.

S3: The application management unit 11 determines whether or not the application ID obtained from, for example, the file name of the internal setting data replacement application 14 is registered in the application management table 13. Here, in the following description, the application ID obtained from the internal setting data replacement application 14 is to be registered in the application management table 13.

S4: The application managing unit 11 expands the read object in a designated directory in the storage unit 27. That is, the object is copied to a corresponding directory for each application. This accelerates a reading speed. Additionally, by copying as described above, the problems that may occur by removing the portable storage medium 9 is eliminated.

S5: The application management unit 11 reads the expanded object of the internal setting data replacement application 14 from the storage unit 27. More specifically, the object is loaded to a memory.

S6: The application management unit 11 executes the internal setting data replacement application 14. That is, The application management unit 11 executes the internal setting data replacement application 14 as a process, and assigns resources to the internal setting data replacement application 14. This allows the internal setting data replacement unit 22 to be implemented and the internal setting data replacement unit 22 starts operating in the electronic apparatus 30A.

<Obtaining and Transmitting of Setting Data>

Figure 11:
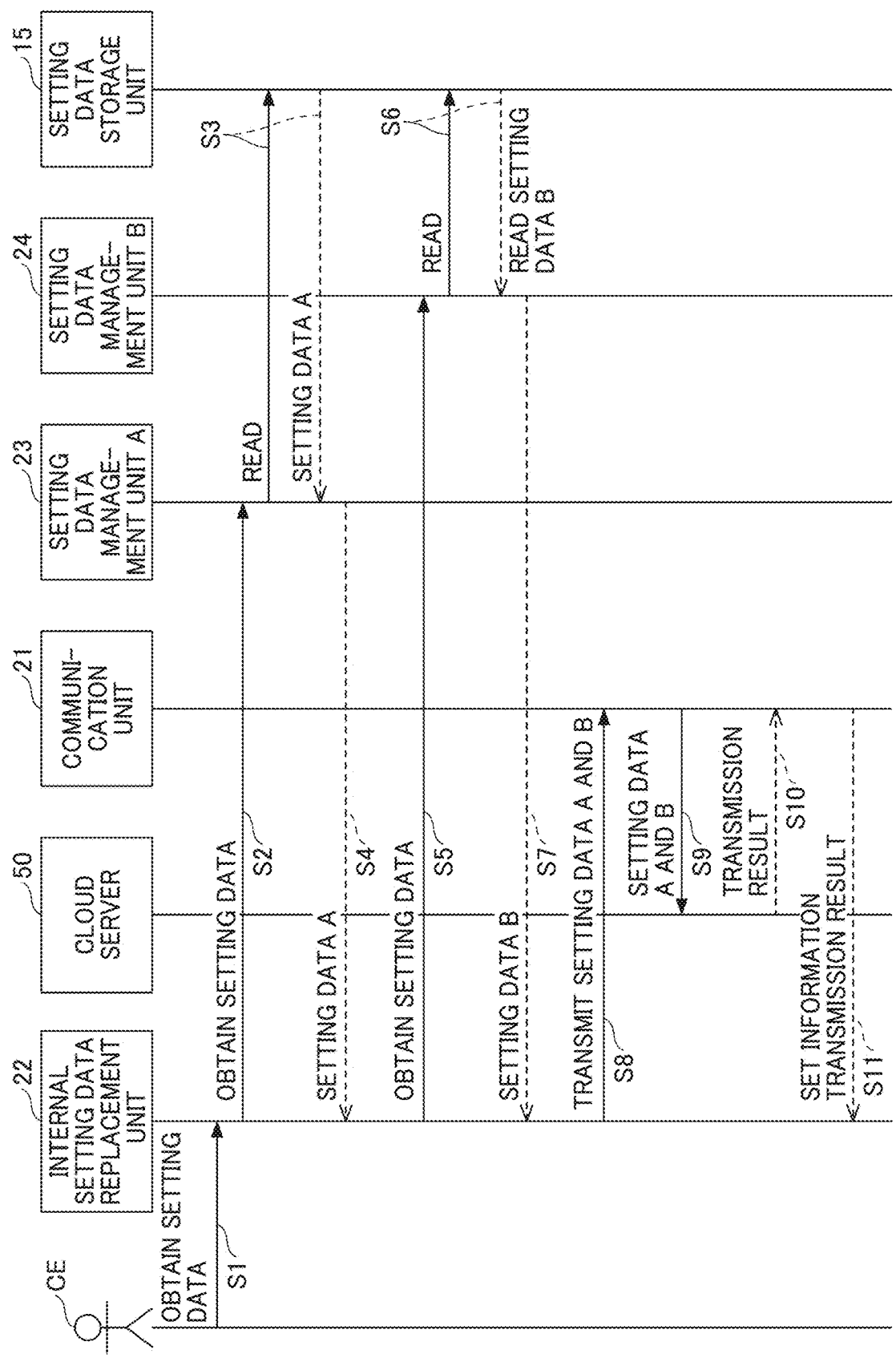
FIG. 11 is a sequence diagram illustrating an example of operation of obtaining setting data and transmitting the setting data to the cloud server by the internal setting data replacement unit.

FIG. 11 is a sequence diagram illustrating an example of operation of obtaining the setting data and transmitting to the cloud server 50 with the internal setting data replacement unit 22. In the description of FIG. 11, the application communication unit 12 is omitted for simplicity.

S1: The customer engineer CE operates the electronic apparatus 30A to obtain the setting data. The internal setting data replacement unit 22 requests for the setting data using an application screen displayed on the control panel 411.

S2: The internal setting data replacement unit 22 requests the setting data management unit A to obtain the setting data. In the internal setting data replacement unit 22, each of the applications (setting data management unit A 23 and setting data management unit B 24) are associated with the corresponding setting data to be managed, so that the customer engineer CE is not required to concern each of the setting data management unit A 23 and the setting data management unit B 24.

S3: The setting data management unit A 23 reads the setting data A from the setting data storage unit 15 of the storage unit 27.

S4: The setting data management unit A 23 sends the read setting data A to the internal setting data replacement unit 22.

S5: Subsequently, the internal setting data replacement unit 22 requests the setting data management unit B 24 to obtain the setting data.

S6: The setting data management unit B 24 reads the setting data B from the setting data storage unit 15 of the storage unit 27.

S7: The setting data management unit B 24 sends the read setting data B to the internal setting data replacement unit 22.

S8: The internal setting data replacement unit 22 sends the setting data A and the setting data B to the communication unit 21.

S9: The communication unit 21 transmits the setting data A and the setting data B to a destination identified with a predetermined IP address of the cloud server 50.

S10: The cloud server 50 transmits a transmission result to the communication unit 21.

S11: The communication unit 21 sends the transmission result to the internal setting data replacement unit 22.

<Example of Screen>

FIGS. 12A, 12B, 12C, 12D, 12E, and 12F are illustrations of application screens displayed on the control panel 411 with the internal setting data replacement application 14, which also illustrates an example of transition of the application screens in this order.

Figure 12A:
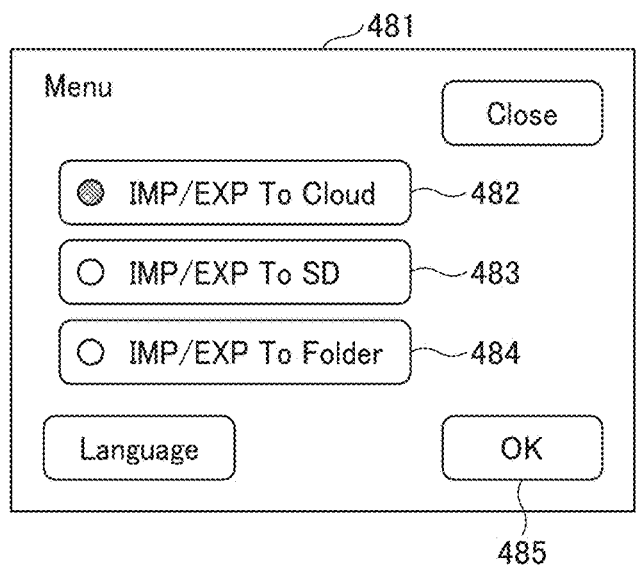
FIGS. 12A to 12F are illustrations of examples of application screens displayed on a control panel by the internal setting data replacement application, which also illustrate an example of transition of the application screens.

FIG. 12A is an example of a menu screen 481 displayed when the internal setting data replacement application 14 is activated. The menu screen 481 has a cloud button 482, an SD button 483, a folder button 484, and an OK button 485. The cloud button 482 is a button for exporting the setting data to the cloud server 50 from the electronic apparatus 30A or importing the setting data from the cloud server 50 to the electronic apparatus 30A. The SD button 483 is a button for exporting the setting data to the portable storage medium 9 from the electronic apparatus 30A or for importing the setting data from the portable storage medium 9 to the electronic apparatus 30A. The folder button 484 is a button for exporting the setting data to the folder to the electronic apparatus 30A or importing the setting data from the folder to the electronic apparatus 30A. The customer engineer CE selects one of the cloud button 482, the SD button 483 and the folder button 484 and presses the OK button 485. In FIG. 12A, the cloud button 482 is selected. The internal setting data replacement unit 22 of the electronic apparatus 30A receives these operations or inputs.

Figure 12B:
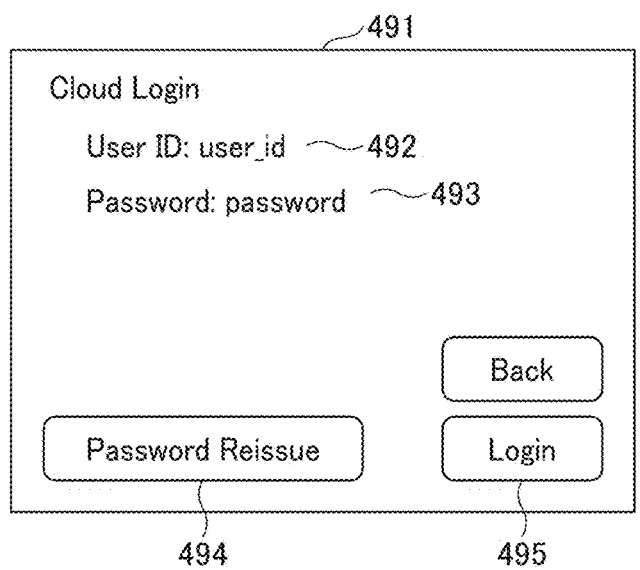

FIG. 12B illustrates an example of a cloud login screen 491. The cloud login screen 491 has a user ID input field 492, a password input field 493, a password reissue button 494, and a login button 495. The customer engineer CE inputs the user ID in the user ID input field 492, inputs the password in the password input field 493, and presses the login button 495. The password reissue button 494 is a button for requesting the cloud server 50 to reissue the password from the electronic apparatus 30A. The electronic apparatus 30A accepts these operations or inputs.

Figure 12C:
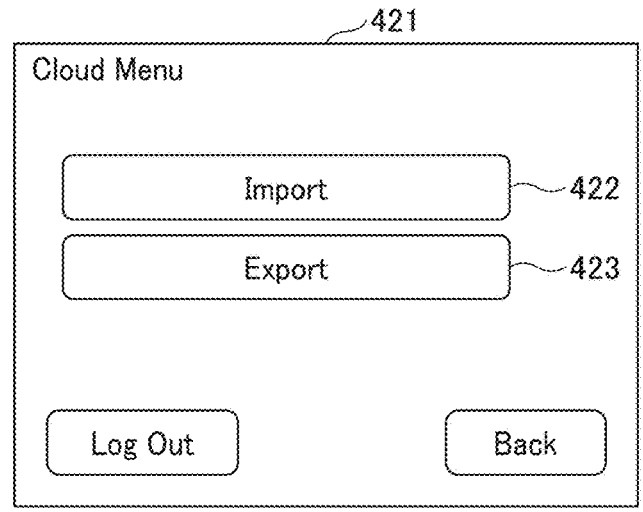

FIG. 12C illustrates an example of a cloud menu screen 421. The cloud menu screen 421 is displayed when the customer engineer CE successfully logs in. The cloud menu screen 421 has an import button 422 and an export button 423. When importing the setting data, the customer engineer CE presses the import button 422, and when exporting the setting data, the customer engineer CE presses the export button 423. Here, in the description of the embodiment, the export button 423 is to be pressed. The internal setting data replacement unit 22 of the electronic apparatus 30A receives these operations or inputs.

Figure 12D:
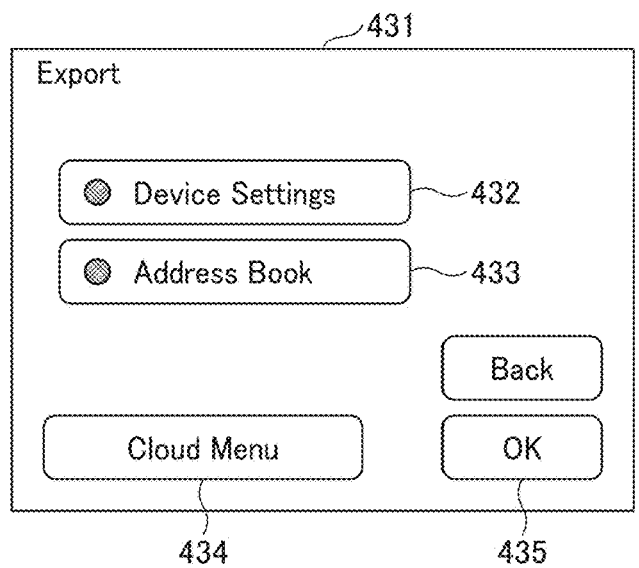

FIG. 12D illustrates an example of an export screen 431. The export screen 431 has a device setting button 432, an address book button 433, a cloud menu button 434, and an OK button 435. The device setting button 432 and the address book button 433 indicate the setting data that is obtainable with the internal setting data replacement application 14. The customer engineer CE presses the device setting button 432 when exporting the setting data except for, or without, the address book, and presses the address book button 433 when exporting the address book out of the setting data. The cloud menu button 434 is a button for returning to the cloud menu screen 421. Here in the description, the device setting button 432 and the address book button 433 are to be selected and the OK button 435 is to be pressed. When the OK button 435 is pressed, the export starts. The internal setting data replacement unit 22 of the electronic apparatus 30A receives these operations or inputs.

Figure 12E:
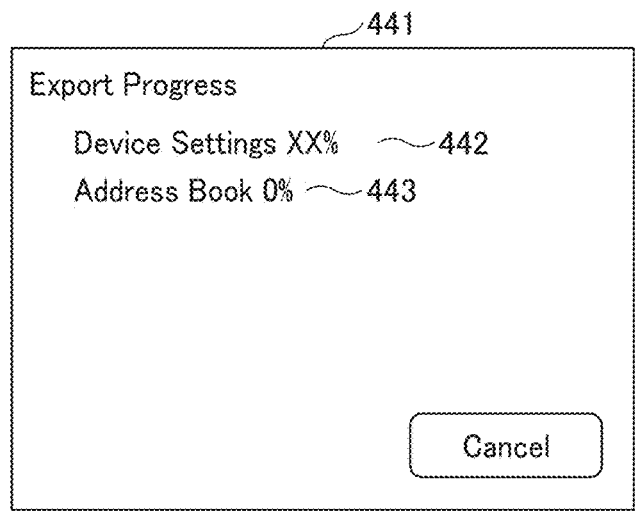

FIG. 12E is an example of an export progress screen 441. The export progress screen 441 displays a progress 442 of the export of the setting data and a progress 443 of the export of the address book. For example, a rate of data exported in relation to the whole setting data to be exported is displayed.

Figure 12F:
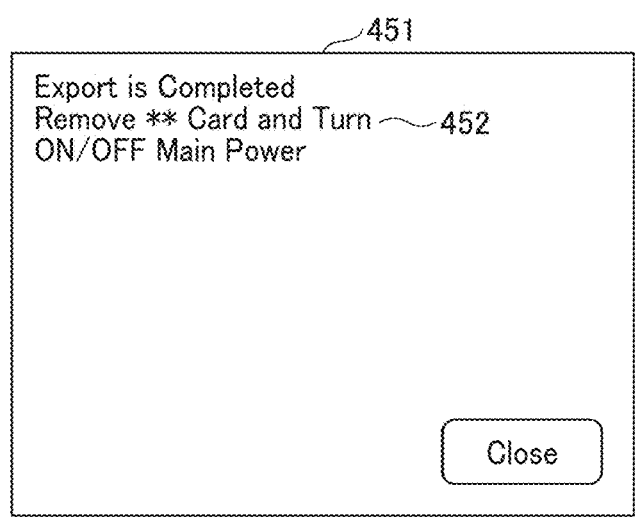

FIG. 12F is an example of an export completion screen 451. The export completion screen 451 is a screen for notifying the customer engineer CE of the completion of the export. For example, the internal setting data replacement unit 22 displays a message 452 "Remove ** Card and Turn ON/OFF Main Power" 452.

As described above, the electronic apparatus 30A of the present embodiment executes the internal setting data replacement application 14 operating as an internal application, and the internal setting data replacement application 14 obtains the setting data A and the setting data B. Through this, all setting data that is obtainable with the internal application 26 is obtained. Additionally, although the electronic apparatus 30A is able to execute the internal application 26 of which the application ID is registered, the electronic apparatus 30A is able to execute the internal setting data replacement application 14 by being given an application ID of the process application to the internal setting data replacement application 14.

Second Embodiment

According to the first embodiment, the electronic apparatus 30A is able to export the setting data to cloud server 50. By importing this setting data to the electronic apparatus 30B, the setting data is successfully moved to the electronic apparatus 30B.

However, the setting data in the electronic apparatus 30A includes a number of items that are depending on each other. For example, in use of the FAX, there is a setting in relation to a destination (specified destination setting). When the customer engineer registers a name of the destination in the specified destination setting, the information of the setting data fails to be consistent unless the specified destination setting is set as "Register". As described above, items between which a discrepancy may occur are regarded as having dependency relationship.

Additionally, there is a case where the customer engineer CE wants to change an item of the setting data before importing. Such an item that is requested to be changed, or to be changed, may be referred to as a target item in the description below. To change the target item and another item that have a dependency relationship with the target item, which is to be changed, the customer engineer CE is required to import all of the setting data and consider the dependency relationship, and then change the target item and the item having the dependency relationship with the target item. Importing all of the setting data each time when an additional change occurs may give a negative impression to the client.

The electronic apparatus 30A according to the second embodiment transmits the target item and a value of the setting data, which the customer engineer wants to change, to the cloud server 50, and the cloud server 50 identifies the item that has the dependency relationship with the target item, of which the setting data is requested to be changed to generate appropriate import data. Through this, even when there is an item having the discrepancy relationship with the target item, the appropriate import data is generated. This eliminates necessity of importing all of the setting data, and reduces a time taken to import in changing a part of the items.

An exemplary electronic apparatus according to one of the embodiment and a data processing method performed by the electronic apparatus according to the present embodiment are described with reference to the drawings.

<Schematic Operation of Cloud Server 50>

Figure 13:
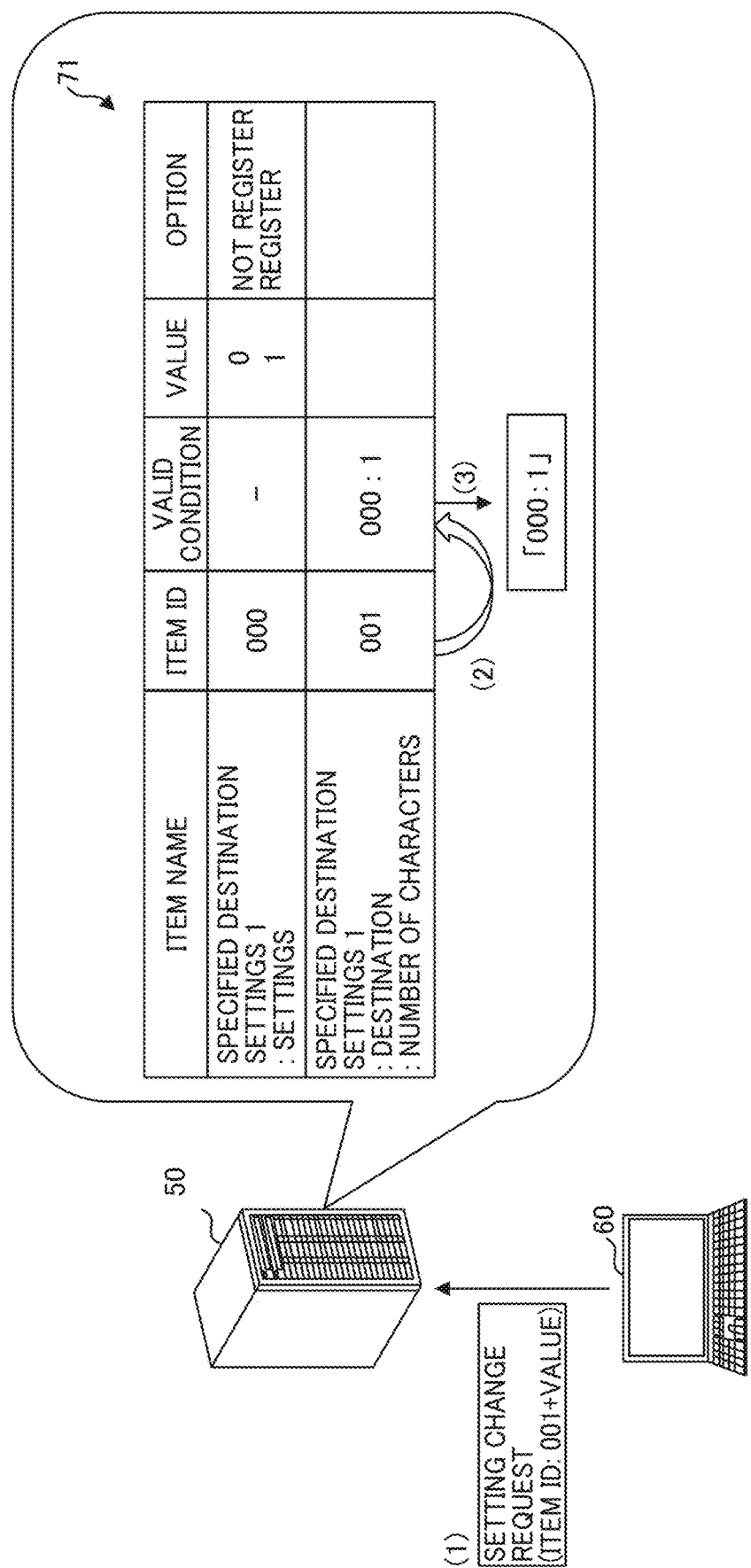
FIG. 13 is a schematic diagram illustrating operation of the cloud server according to one of the embodiments (second embodiment)

FIG. 13 is a schematic diagram illustrating operation of the cloud server 50 according to the embodiment. The cloud server 50 manages a setting data management table 71, which is described later. In the setting data management table 71, a valid condition is set for each item of the setting data. This valid condition indicate the dependency relationship. A valid condition of an item is set with an item ID, the item identified with the item ID is a value indicated with the valid condition. In FIG. 13, the valid condition of the item ID of "001" is "000: 1". "000" is an item ID and "1" is an appropriate value. That is, this indicates that a value of the item identified with the item ID of "000" is to be "1". The cloud server 50 performs processing as follows using the setting data management table 71.

(1) A user PC 60 transmits a setting change request including an item ID and a value of the target item to the cloud server 50. Here, the setting change request for the target item is to include the item ID of "001".

(2) The cloud server 50 refers to the valid condition of the item identified with the item ID of "001". According to the reference, the valid condition is "000: 1".

(3) The cloud server 50 generates import data in which the value of the item identified with the item ID of "000" is "1".

That is, when the valid condition is set in association with the target item, for which the user requests the setting change, the cloud server 50 generates setting data of the item designated with the valid condition, in addition to the target item, for which the user request the setting change, as import data. As described above, by generating the import data of the item that is not a target item, using the valid condition, the cloud server 50 keeps consistency between the target item, which is subject to the setting change, and the item having the dependency relationship with the target item.

<Example of System Configuration>

Figure 14:
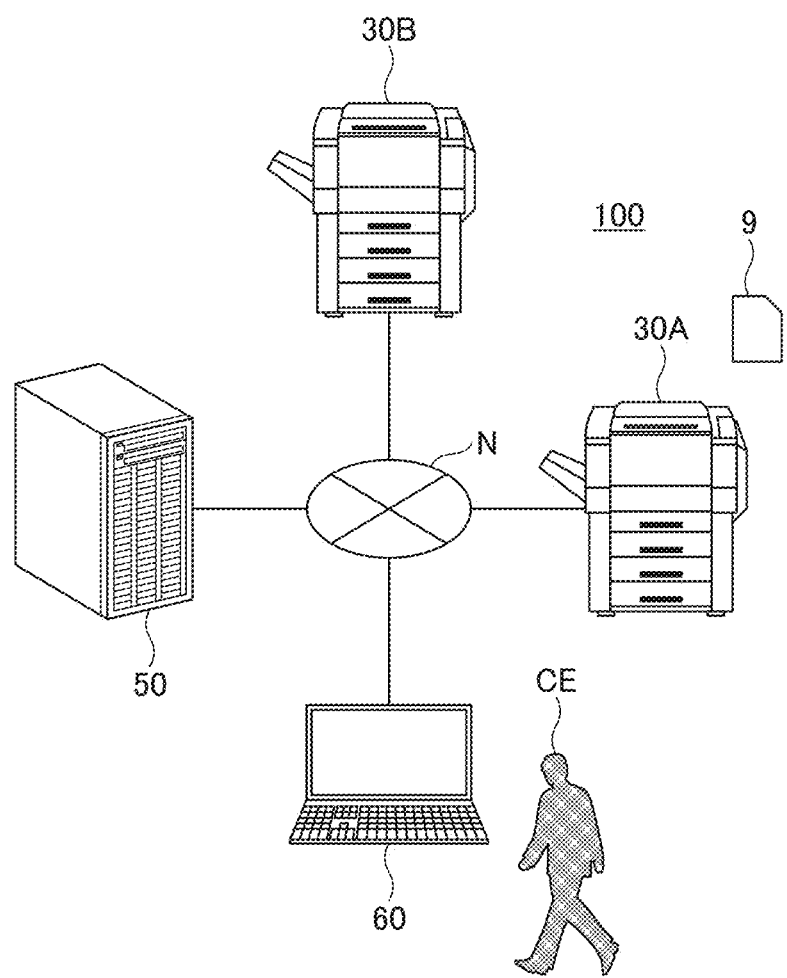
FIG. 14 is a schematic diagram illustrating an example of a data setting system according to another one of the embodiments (second embodiment)

FIG. 14 is a schematic diagram illustrating an example of the data setting system 100 according to the present embodiment. In FIG. 14, the same reference numerals as that in FIG. 3 are assigned to the same or like elements. A description is given of main elements of this embodiment below.

In FIG. 14, the user PC 60 is connected to the network N. The user PC 60 is a terminal device operated mainly by the customer engineer CE. More specifically, the user PC 60 includes, for example, a PC (Personal Computer), a smartphone, a tablet terminal, and a personal digital assistant (PDA). Additionally, in some of the embodiments, the user PC 60 is an MFP, a projector, or a videoconference terminal, each of which serves as an information processing apparatus.

The other part of the configuration of the data setting system 100, according to the present embodiment, is the same as that in FIG. 3, but in the present embodiment, the electronic apparatus 30B is to be an import destination of import data. That is, the cloud server 50 holds the setting data (export data) exported from the electronic apparatus 30A as described in the first embodiment. There is a case where the customer engineer CE operates the user PC 60 to change arbitrary items of the setting data. In such a case, the export data does not need to be downloaded. The user PC 60 transmits a setting change request to the cloud server 50. In response to the setting change request, the cloud server 50 changes a part of the export data to generate the import data.

Additionally, the electronic apparatus 30B includes, in advance, a function that is equivalent to the internal setting data replacement application 14 described in the first embodiment. The electronic apparatus 30B is an electronic apparatus that is a destination of the setting data so that an internal application that enables the electronic apparatus 30B to obtain and write the setting data is able to be installed at a time of shipment of the electronic apparatus 30B. However, there is also a case where the electronic apparatus 30B is an old type model that is already shipped. In such a case, the electronic apparatus 30B executes the internal setting data replacement application 14 to import the import data to the electronic apparatus 30B. Accordingly, when the setting data is transferred from the electronic apparatus 30A, which is an old type, to the electronic apparatus 30B, which is a new type, the electronic apparatus 30A executes the internal setting data replacement application 14 and the electronic apparatus 30B executes the internal application. When the setting data is transferred from the electronic apparatus 30A, which is the old type, to the electronic apparatus 30B, which is another old type, the electronic apparatus 30A executes the internal setting data replacement application 14 and the electronic apparatus 30B also executes the internal setting data replacement application 14.

<Function of Cloud Server>

FIG. 15A and FIG. 15B (FIG. 15) are a block diagram illustrating one example of a functional configuration of the user PC 60, the cloud server 50, and the electronic apparatus 30B. The user PC 60 has substantially the same hardware configuration as that of the cloud server 50. Even if there is a difference between these hardware configurations, the difference does not effect to a scope of the description of the embodiment.

<<Electronic Apparatus>>

The electronic apparatus 30B includes a data transmitting/receiving unit 41, an import execution unit 42, and a setting data storage unit 15. The setting data storage unit 15 is same as that in FIG. 6 of the first embodiment. Each of these functional units is implemented by operating one or more hardware elements illustrated in FIG. 4 in cooperation with instructions of the CPU 401 according to the program 408p (application) expanded from the HDD 408 to the RAM 402b.

The data transmitting/receiving unit 41 receives the import data mainly from the cloud server 50. In some of the embodiments, the data transmitting/receiving unit 41 has a function of transmitting (exporting) the setting data to the cloud server 50.

The import execution unit 42 imports a value of the setting data received as import data from the cloud server 50. The import execution unit 42 is a function implemented by the internal application, which is equivalent to the internal setting data replacement application 14 of the first embodiment. On obtaining an item ID and a value, the import execution unit 42 calls the setting data management unit A 23 and the setting data management unit B 24 to set value of the setting data that is identified with the item ID.

<<User PC 60>>

The user PC 60 includes a transmitting/receiving unit 61, an operation receiving unit 62, and a screen display unit 63. Each of these functional components included in the user PC 60 is a function or means implemented by operating one or more hardware elements illustrated in FIG. 5 in cooperation with instructions of the CPU 201 according to the program 209p stored in the HDD 209. The program 209p executed by the user PC 60 includes screen information transmitted from the cloud server 50. The screen information is a program written in a HyperText Markup Language (HTML), a script language, and a cascading style sheet (CSS), and a structure of a Web page is specified mainly with HTML, the operation of the Web page is specified with the script language, and a style of the Web page is specified with the CSS.

A Web application is implemented by executing the screen information by the user PC 60. Although the Web application is not defined clearly, for example, the Web application is defined as that the cloud server 50 dynamically builds a Web page in response to a user's request, or the Web page operates with the script language.

The transmitting/receiving unit 61 is implemented by the CPU 201 of FIG. 5 executing the program 209p to control the network driver 205, and transmits and receives various types of data to and from the cloud server 50.

The operation receiving unit 62 is implemented by the CPU 201 of FIG. 5 executing the program 209p to control the input device 210, and receives various operations to the user PC 60.

The screen display unit 63 is implemented by the CPU 201 of FIG. 5 executing the program 209p to control the graphics driver 204, and displays various screens on the LCD 206.

<<Cloud Server 50>>

The cloud server 50 accepts a request for processing from the user PC 60 and accepts a request for edition of the setting data so as to be compatible with the electronic apparatus 30B, which is an import destination.

The cloud server 50 includes a data input/output unit 51, a device setting data management unit 52, an import data generating unit 53, a setting data management table storage unit 57, an import data storage unit 56, and an export data storage unit 55. These functions of the cloud server 50 are functions implemented by the CPU 201 of FIG. 5 executing the program 209p stored in the HDD 209.

The export data storage unit 55 is a database or storage unit built in the HDD 209 of FIG. 5 or the like, and stores the export data in association with a device ID that identifies the electronic apparatus 30.

The import data storage unit 56 is a database or a storage unit built in the HDD 209 of FIG. 5 or the like, and stores the import data to be imported to the electronic apparatus 30B in association with the device ID. The import data in an initial state is generated by copying the export data, and is changed for each item by the import data generating unit 53.

The setting data management table storage unit 57 is a database or a storage unit built in the HDD 209 of FIG. 5 or the like and stores the setting data management table 71 illustrated as Table 3.

The device setting data management unit 52 is implemented by the CPU 201 of FIG. 5 executing the program 209p, and functions as a Web server for the user PC 60. On receiving the setting change request from the user PC 60, the device setting data management unit 52 requests the import data generating unit 53 to generate the import data.

The data input/output unit 51 is implemented by the CPU 201 of FIG. 5 executing the program 209p to control the network driver 205, and receives the export data from the electronic apparatus 30A and sends the import data to the electronic apparatus 30B.

The import data generating unit 53 is implemented by the CPU 201 of FIG. 5 executing the program 209p or the like. The import data generating unit 53 includes a determination unit 54. The determination unit 54 refers to the setting data management table 71 to determine whether a target item that is an object of the setting change request is changeable or not and weather there is an item having the dependency relationship with the target item. The import data generation unit 53 generates the import data according to a determination result of the determination unit 54. When there is no dependency relationship, the import data generation unit 53 generates the import data of the target item of the setting change request, and when there is the dependency relationship the import data generation unit 53 generates the import data according to the valid condition. The import data generating unit 53 stores the generated import data in the import data storage unit 56. On generating the import data, the import data generating unit 53 acquires the item ID and notifies the device setting data management unit 52 of the item ID. This notification is transmitted to the user PC 60 and this allows user to know that the import data for the item having the dependency relationship with the target item is generated.

<Setting Data Management Table> Table 3 Illustrates an Example of the Setting Data Management Table 71.

TABLE 3

| Management Module | Classification | Item Name | Item ID | Type of Value | Valid Condition | Maximum Value | Minimum Value | Value | Option |
|---|---|---|---|---|---|---|---|---|---|
| Initial Setting (FAX) | Reception Settings | Specified Destination Settings 1: Settings | 000 | UNIT | — | | | 0<br>1 | Not register<br>Register |
| Initial Setting (FAX) | Reception Settings | Specified Destination Settings 1: Destination: The Number of Characters | 001 | UNIT | 000:1 | 24 | 0 | | |
| Initial Setting (FAX) | Reception Settings | Specified Destination Settings 1: Destination | 002 | STR | 000:1 | 24 | 0 | | |
| Initial Setting (FAX) | Reception Settings | Specified Destination Settings 1: Match Condition | 003 | UNIT | 000:1 | | | 0<br>1 | Complete Match<br>Partial Match |
| Initial Setting (FAX) | Reception Settings | Specified Destination Settings 1: The Number of Copies for Printing of Received Documents Per Destination: Settings | 004 | UNIT | 000:1 | | | 0<br>2 | Follow Overall Settings Design partially |
| Initial Setting (FAX) | Reception Settings | Specified Destination Settings 1: The Number of Copies for Printing of Received Documents Per Destination: The Number of Copies | 005 | UNIT | 004:2 | 10 | 1 | | |
| Initial Setting (FAX) | Reception Settings | Specified Destination Settings 1: Reception Link Settings Per Destination: Settings | 006 | UNIT | 000:1 | | | 0<br>1 | Not Link<br>Link |
| Initial Setting (FAX) | Reception Settings | Specified Destination Settings 1: Link Destination: The Number of Characters | 007 | UNIT | 006:1 | 64 | 0 | | |
| Initial Setting (FAX) | Reception Settings | Specified Destination Settings 1: Reception Link Settings Per Destination: Link Destination | 008 | STR | 006:1 | 64 | 0 | | |

The setting data management table 71 includes items of management module, classification, item name, item ID, type of value, valid condition, maximum value, minimum value, value, and option. The setting data management table 71 is prepared for each model. —Management module is a setting data management unit for managing each item in the electronic apparatus 30. —Classification indicates with which function each item is used. —Item name is a name of each item with which the user knows contents. —Item ID is information for identifying each item. —Value type indicates a type (numerical value, character, symbol, etc.) of data of each item. —Valid condition indicates contents of the dependency relationship when each item has the dependency relationship (as described above with reference to FIG. 13). —Maximum value and minimum value are an upper limit value and a lower limit value, respectively, for each item. —Value is a possible value of each item (in a case where each item does not have the maximum value or the minimum value). —Option indicates a content corresponding to each value.

The cloud server 50 determines whether or not the setting change request transmitted from the user PC 60 is suitable by checking the type, the maximum value, the minimum value, and the value with the setting data management table 71. Additionally, the cloud server 50 determines whether or not there is the dependency relationship according to the valid condition, and generates a value of the item having the dependency relationship (import data).

<Example of Screen of User PC 60>

Figure 16:
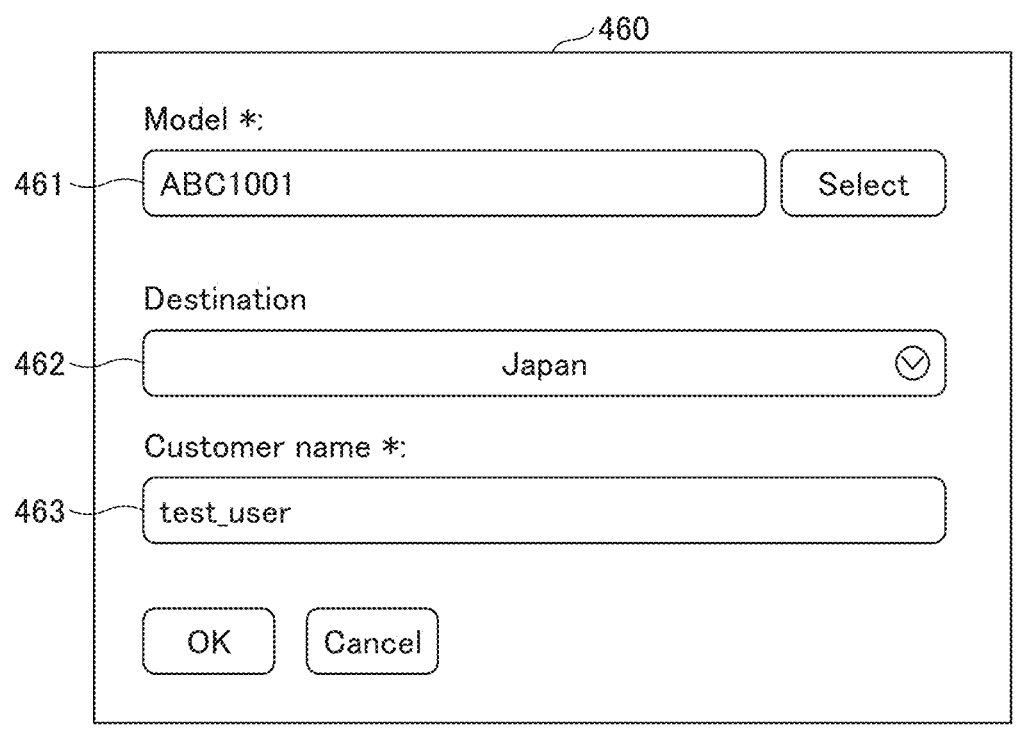
FIG. 16 is an illustration of a setting screen displayed on the user PC according to the second embodiment.

FIG. 16 is an illustration of the setting screen 460 displayed on the LCD 206 of the user PC 60. When changing a part of the export data, the customer engineer CE causes the setting screen 460 to be displayed. The setting screen 460 is generated from the screen information transmitted from the cloud server 50.

The setting screen 460 includes a model name selection field 461, a migration destination field 462, and a customer name field 463. The model name selection field 461 is a field for selecting the model name of the electronic apparatus 30B from which the import data is imported by the customer engineer CE. The migration destination field 462 is a country or a region where the electronic apparatus 30B is. The customer name field 463 is a field to which the customer engineer CE inputs a customer name of the electronic apparatus 30B.

Figure 17:
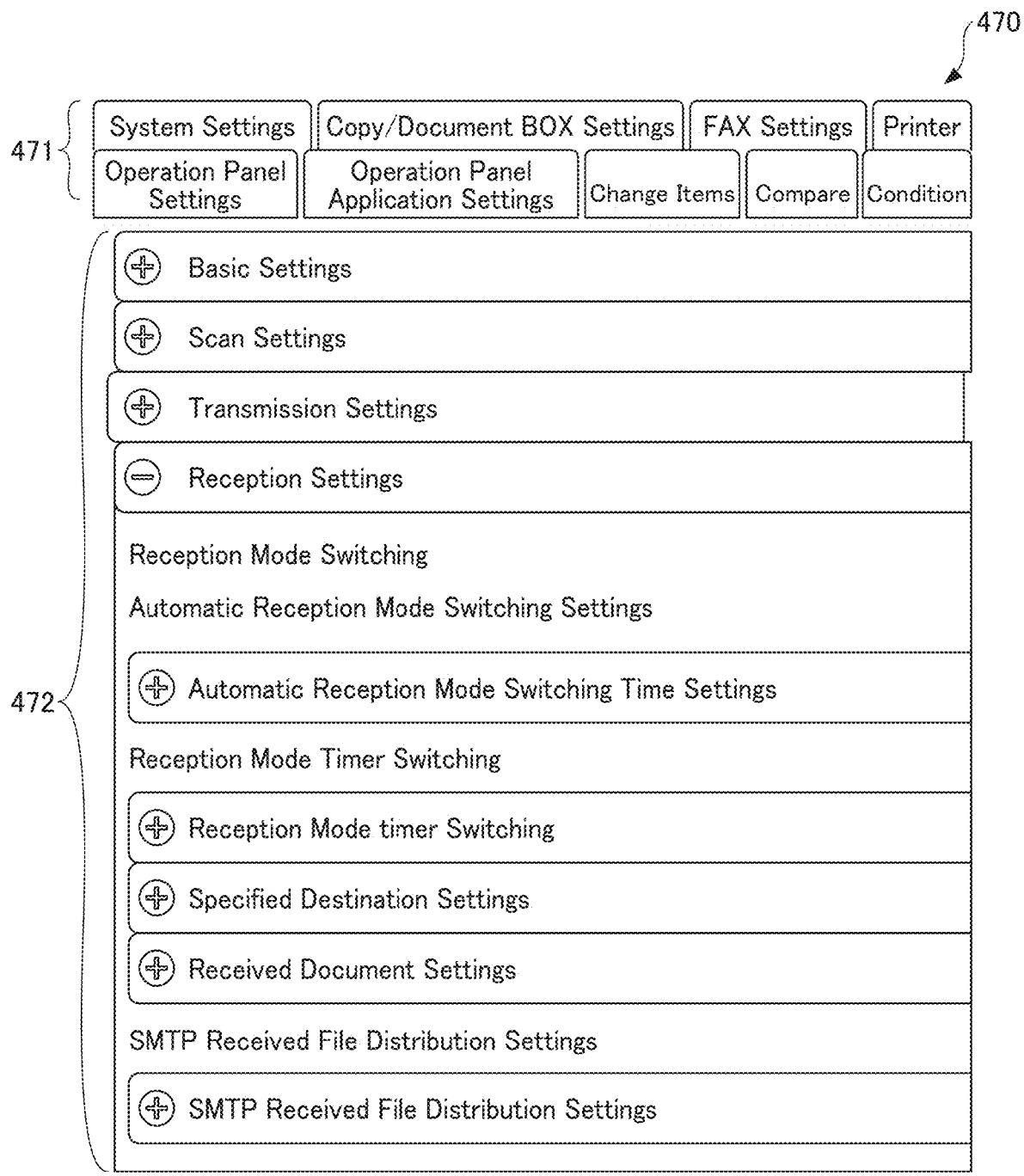
FIG. 17 is an illustration of a setting data change screen according to the second embodiment.

FIG. 17 is an illustration of the setting data change screen 470. On the setting data change screen 470, several tabs 471 and settable items 472 that are settable by the tab are displayed. The setting data change screen 470 displays the values settable with a model selected by the customer engineer CE, the customer engineer CE changes the value of the target item, which the customer engineer CE wants to change. That is, the user PC 60 does not required to download the export data. When the customer engineer CE presses, for example, a send button in the settable items 472, a setting change request is transmitted to the cloud server 50.

<Operation of Cloud Server>

Figure 18:
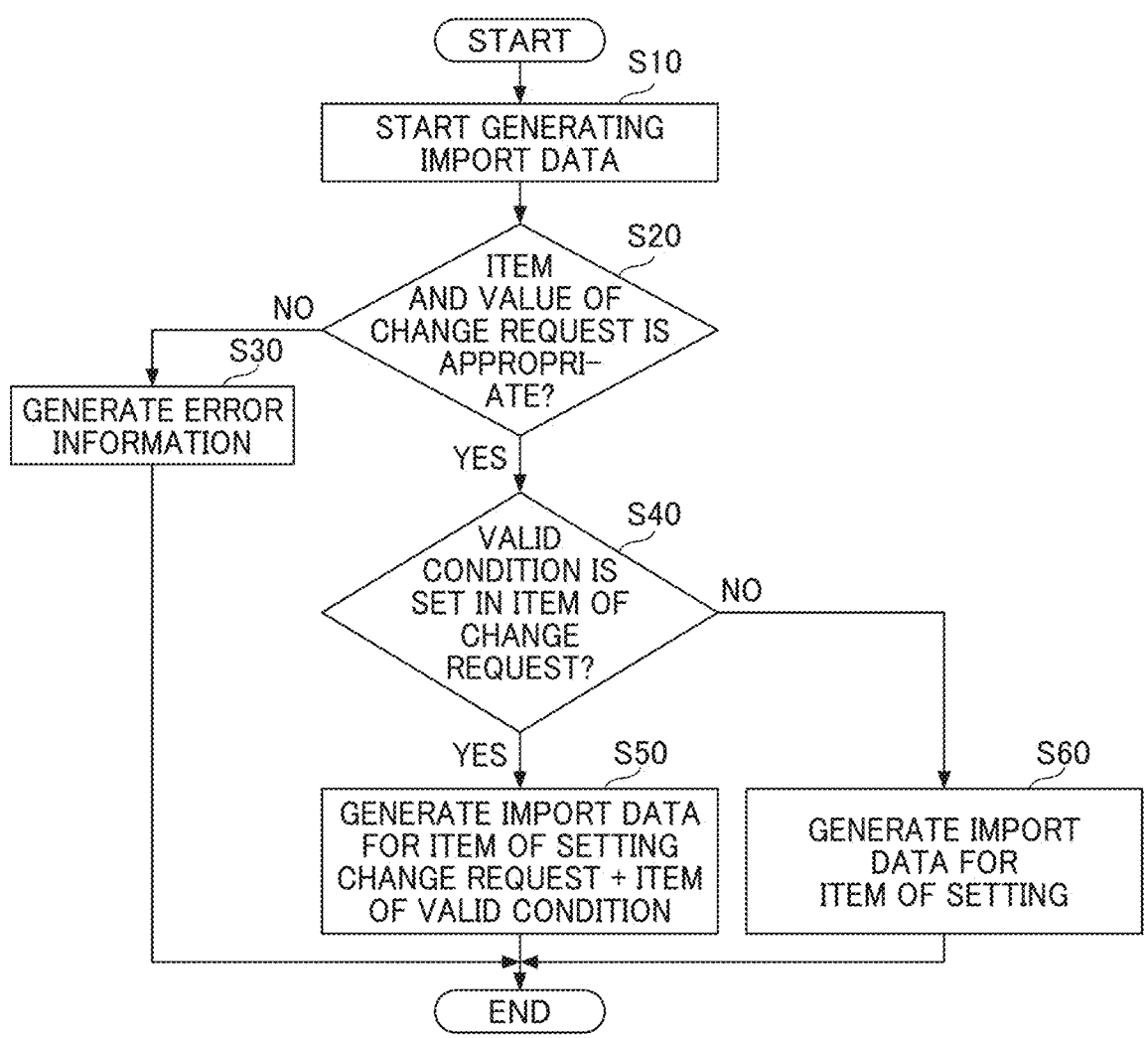
FIG. 18 is an example of a flowchart illustrating a process, performed by the cloud server, of determining whether there is an item being dependence on an item requested to be changed and generating import data.

FIG. 18 is an example of a flowchart illustrating a process, performed by the cloud server 50, of determining whether there is an item having the dependency relation with the target item, which is requested to be changed and generating the import data. The process in FIG. 18 starts when the cloud server 50 receives a setting change request.

The device setting data management unit 52 receives the setting change request and sends an import data generating request to the import data generating unit 53 (S10).

The determination unit 54 of the import data generating unit 53 determines whether each of the target items included in the setting change request is appropriate to be changed, for example, each of the items included in the setting change request is settable with a type of model to be replaced, each of the items included in the setting change request has a settable value, etc., (S20). Whether or not the target item is settable with the type of model to be replaced is determined by referring to the setting data management table 71, which is prepared for the type of model to be replaced, and checking whether there is an item ID included in the setting change request. Whether or not the value is settable is determined by comparing the value type, the maximum value, the minimum value, and the value in the setting data management table 71 prepared for the type of model to be replaced with those items included in the setting change request, individually. That is, the determination unit 54 of the import data generating unit 53 determines whether the type of the value of the target item of the setting change request matches the type of the value set in the setting data management table 71, whether the value of the target item of the setting change request is in a range between the maximum value and the minimum value of the setting data management table 71, and whether the value of the target item of the setting change request matches the value of the setting data management table 71.

If the determination in S20 is No, the import data generating unit 53 generates information on an error indicating the import data generating unit 53 fails to generate the import data, and stops generating the import data (S30). The error information includes, for example, the item ID and a cause of the error, and is transmitted to the user PC 60.

When the determination in S20 is Yes, the determination unit 54 determines whether or not an valid condition is set for the target item of the setting change request (S40).

If the determination in S40 is Yes, the import data generating unit 53 generates the import data in association with the item set in the valid condition and an appropriate value set in the valid condition, in addition to the import data of the target item and the value included in the setting change request (S50).

When the determination is No, the import data generating unit 53 generates import data of the target item and the value included in the setting change request (S60).

<Example of Generating Import Data>

An example of generating the import data based on the valid condition is described. For example, in the setting data management table 71 of Table 3, the valid condition of the item having the item ID of "005" with "initial setting (FAX)>reception setting>specified destination setting 1: the number of copies for printing of received documents for the destination: the number of copies" is "004:2". When the customer engineer is to change this item, the setting value of the item ID of "004" with (initial setting (FAX)>reception setting>specified destination 1: the number of copies for printing of received documents per the destination: set) is to have setting value, 2, (the number of copies is designated) for consistency. The import data generating unit 53, accordingly, generates a set, or pairs, of the import data for a value designated with the setting change request having the item ID of "005" and the import data for the item ID of "004" and the value of "2" in response to the setting change request of the item ID of "005".

This maintains the dependency relationship, in the import data, of the part of the items that is requested to be changed by the customer engineer CE.

<Setting Data in Association with Setting Change Request and Import Data to be Generated>

The target item included in the setting change request and the import data to be generated are described with reference to FIG. 19 and FIG. 20. FIG. 19 is a table for explaining the setting change request. In FIG. 19, setting change requests having the item ID of "001" and the value of "24", and the item ID of "005" and the value of "2" are illustrated.

The setting change request with the item ID of "001" and the value of "24" is described. Referring to the setting data management table 71 of Table 3, the valid condition of the item ID of "001" is "000: 1". The import data generating unit 53, accordingly, generates the import data having the item ID of "001" and the value of "24", and import data having the item ID of "000" and the value of "1".

Figure 20:
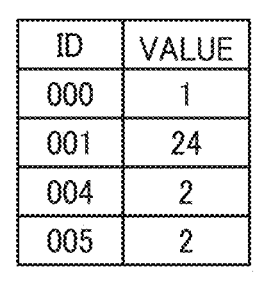

FIG. 20 is a table for explaining the import data generated by the import data generating unit 53. Referring to FIG. 20, import data of item ID of "001" and item ID of "000" are generated in the first line and the second line, respectively.

Return to FIG. 19, the setting change request having the item ID of "005" and the value of "2" is described. Referring to the setting data management table 71 of Table 3, the valid condition of the item ID of "005" is "004: 2". The import data generating unit 53 generates import data having the item ID of "005" and the value of "2", and import data having the item ID of "004" and the value of "2".

As illustrated in the third and fourth lines of FIG. 20, import data with item ID of "004", and import data with the item ID of "005", are generated.

As described above, the data setting system 100 according to the present embodiment generates the setting data of another item designated with the valid condition as the import data, when the valid condition is set for the target item for which the user requested to change with the setting change request, resulting in consistency in the case where the target item to be changed has the dependency relation with another item. Additionally, the user PC 60 does not be required to download the entire export data in response to change in some items, resulting in reducing the time required for importing the setting data.

<Other Example for Application>

The above-described embodiments are illustrative and do not limit the present disclosure. Thus, numerous additional modifications and variations are possible in light of the above teachings within the scope of the present disclosure. Any one of the above-described operations may be performed in various other ways, for example, in an order different from the one described above.

For example, in the description of the embodiments described above, the setting data of the electronic apparatus 30 is imported and exported with the internal setting data replacement application 14 that is installed in the electronic apparatus 30, however the data to be exported or imported is not limited to the setting data. Any data stored in the electronic apparatus 30 is able to be exported or imported.

Further, in the description of the embodiments described above, the internal setting data replacement application 14 is unable to acquire the setting data unless communicating with the setting data management unit A 23 and the setting data management unit B 24. In some embodiments, however, the internal setting data replacement application 14 alone is able to acquire the setting data.

Further, not only for exporting or importing the data, but also for adding a new function to the electronic apparatus 30, the application stored in the portable storage medium 9 may be installed. For example, the electronic apparatus 30 installed with an application for controlling the electronic apparatus 30 is provided with another application for providing a user interface (UI) to the application for controlling the electronic apparatus 30 from the portable storage medium 9. For example, if various applications for each user (UI) are prepared according to user authority, usable functions are limited for each user.

Additionally, the example illustrations of FIG. 6 and FIG. 15 of the configurations are illustrated in a simple manner in which the operation of each of the electronic apparatus 30, the cloud server 50, and the user PC 60 are divided according to main functions for easy understanding. The disclosure is not limited to how to divide or the names of each component. The processing of each of the electronic apparatus 30, the cloud server 50, and the user PC 60 may be further divided into a number of units of the processing according to contents of processing. Alternatively, the processing may be divided in a manner that a unit of the processing may include the more number of units of processing.

Note that the application management unit 11 is an example of a program execution unit, the application communication unit 12 is an example of a communication unit, the application management table 13 is an example of program registration information, the setting data management units A and B are examples of first programs, the internal setting data replacement application 14 is an example of a second program, the SDK setting data replacement application 33 is an example of a third program, and the SDK application I/F 32 is an example of an interface. The communication unit 21 is an example of a setting data transmitting/receiving unit.

The data input/output unit 51 is an example of a first receiving unit, the device setting data management unit 52 is an example of a second receiving unit, the determination unit 54 is an example of a determination unit, the import data generating unit 53 is an example of data generating means. The setting data management table is an example of information on the dependency relationship, and the process program is an example of a process application.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing apparatus comprising: processing circuitry configured to, receive setting data from a first image forming apparatus communicably connected to the information processing apparatus via a network, the setting data being set in the first image forming apparatus, receive a change request from a terminal apparatus communicably connected to the information processing apparatus via the network, the change request requesting a change of a value of a particular item of a plurality of items of the setting data, determine whether a target item having a dependency relationship with the particular item of the change request exists within the setting data set in the first image forming apparatus by referring to dependency relationship information stored in a memory of the information processing apparatus, generate import data based on whether the target item exists, and transmit the import data to a second image forming apparatus communicably connected to the information processing apparatus via the network.

2. The information processing apparatus of claim 1, the processing circuitry is further configured to generate the import data of the particular item and the import data of the target item having the dependency relationship with the particular item, in response to determining that the target item having the dependency relationship with the particular item exists.

3. The information processing apparatus of claim 1, the processing circuitry is further configured to generate the import data of only the particular item, in response to determining that the target item having the dependency relationship with the particular item does not exist.

4. The information processing apparatus of claim 1, wherein in the dependency relationship information, for each item of the setting data, an appropriate value of an item having the dependency relationship with the each item is set, and the processing circuitry is further configured to, generate the import data of the item having the dependency relationship with the particular item as the target item of the change request, the import data being associated with the appropriate value, in response to determining that the target item having the dependency relationship with the particular item exists.

5. The information processing apparatus of claim 1, wherein in the dependency relationship information, for each item of the setting data, an appropriate value that the each item is required to take is set, and wherein the processing circuitry is further configured to, determine whether a value of the particular item transmitted together with the change request is the appropriate value of the particular item, and generate no import data, in response to determining that the value of the particular item is not the appropriate value.

6. The information processing apparatus of claim 1, wherein the setting data is exported from the first image forming apparatus into the information processing apparatus and the import data generated therefrom is subsequently imported from the information processing apparatus to the second image forming apparatus.

7. An information processing method performed by an information processing apparatus, the method comprising:

receiving setting data from a first image forming apparatus communicably connected to the information processing apparatus via a network, the setting data being set in the first image forming apparatus;

receiving a change request from a terminal apparatus that is communicably connected to the information processing apparatus via the network, the change request requesting a change of a value of a particular item of a plurality of items of the setting data;

determining whether a target item having a dependency relationship with the particular item of the change request exists within the setting data set in the first image forming apparatus by referring to dependency relationship information stored in a memory of the information processing apparatus, generating import data based on whether the target item exists; and transmitting the import data to a second image forming apparatus communicably connected to the information processing apparatus via the network.

8. The information processing method of claim 7, wherein the generating generates the import data of the particular item and the import data of the target item having the dependency relationship with the particular item, in response to the determining determining that the target item having the dependency relationship with the particular item exists.

9. The information processing method of claim 7, the generating generates the import data of only the particular item, in response to the determining determining that the target item having the dependency relationship with the particular item does not exist.

10. The information processing method of claim 7, wherein in the dependency relationship information, for each item of the setting data, an appropriate value of an item having the dependency relationship with the each item is set, and the generating generates the import data of the item having the dependency relationship with the particular item as the target item of the change request, the import data being associated with the appropriate value, in response to the determining determining that the target item having the dependency relationship with the particular item exists.

11. The information processing method of claim 7, wherein in the dependency relationship information, for each item of the setting data, an appropriate value that the each item is required to take is set, wherein the determining includes determining whether a value of the particular item transmitted together with the change request is the appropriate value of the particular item, and the generating includes generating no import data, in response to the determining determining that the value of the particular item is not the appropriate value.

12. The information processing method of claim 7, wherein the setting data is exported from the first image forming apparatus into the information processing apparatus and the import data generated therefrom is subsequently imported from the information processing apparatus to the second image forming apparatus.

13. A non-transitory recording medium storing a plurality of instructions which, in response to execution by a processor of an information processing apparatus, configures the processor to, receive setting data from a first image forming apparatus communicably connected to the information processing apparatus via the network, the setting data being set in the first image forming apparatus, receive a change request from a terminal apparatus that is communicably connected to the information processing apparatus via the network, the change request requesting a change of a value of a particular item of a plurality of items of the setting data, determine whether a target item having a dependency relationship with the particular item of the change request exists within the setting data set in the first image forming apparatus by referring to dependency relationship information stored in a memory of the information processing apparatus, generate import data based on whether the target item exists, and transmit the import data to a second image forming apparatus communicably connected to the information processing apparatus via the network.

14. The non-transitory recording medium of claim 13, the plurality of instructions, when executed, further configures the processor to, generate the import data of the particular item and the import data of the target item having the dependency relationship with the particular item, in response to determining that the target item having the dependency relationship with the particular item exists.

15. The non-transitory recording medium of claim 13, the plurality of instructions, when executed, further configures the processor to, generate the import data of only the particular item, in response to determining that the target item having the dependency relationship with the particular item does not exist.

16. The non-transitory recording medium of claim 13, wherein in the dependency relationship information, for each item of the setting data, an appropriate value of an item having the dependency relationship with the each item is set, and the plurality of instructions, when executed, further configures the processor to, generate the import data of the item having the dependency relationship with the particular item as the target item of the change request, the import data being associated with the appropriate value, in response to determining that the target item having the dependency relationship with the particular item exists.

17. The non-transitory recording medium of claim 13, wherein in the dependency relationship information, for each item of the setting data, an appropriate value that the each item is required to take is set, and wherein the plurality of instructions, when executed, further configures the processor to, determine whether a value of the particular item transmitted together with the change request is the appropriate value of the particular item, and generate no import data, in response to determining that the value of the particular item is not the appropriate value.

18. The non-transitory recording medium of claim 13, wherein the setting data is exported from the first image forming apparatus into the information processing apparatus and the import data generated therefrom is subsequently imported from the information processing apparatus to the second image forming apparatus.

\* \* \* \* \*